United States Patent [19]

Nagano et al.

[11] Patent Number: 5,556,108

[45] Date of Patent: Sep. 17, 1996

[54] GAME SIGNAL CONVERSION APPARATUS

[75] Inventors: Masakazu Nagano; Mitsuhiro Takano, both of Kyoto, Japan

[73] Assignee: Nintendo Co., Ltd., Kyoto, Japan

[21] Appl. No.: 377,586

[22] Filed: Jan. 24, 1995

[30] Foreign Application Priority Data

Jan. 25, 1994 [JP] Japan ................... 6-023734

[51] Int. Cl.⁶ ............................. A63F 9/22; G06F 17/00
[52] U.S. Cl. ........................................................ 463/45
[58] Field of Search .................................. 273/433, 434, 273/435, 436; 364/410

[56] References Cited

U.S. PATENT DOCUMENTS

| | | | |
|---|---|---|---|
| 4,979,738 | 12/1990 | Frederiksen | 273/436 |
| 5,095,798 | 3/1992 | Okada et al. | 273/435 X |
| 5,134,391 | 7/1992 | Okada | 340/799 |
| 5,207,426 | 5/1993 | Inoue et al. | 273/148 B |

FOREIGN PATENT DOCUMENTS

0487266A1  5/1992  European Pat. Off. ..

*Primary Examiner*—William H. Grieb
*Attorney, Agent, or Firm*—Nixon & Vanderhye

[57] ABSTRACT

A game signal conversion apparatus includes a CPU which generates image data representing a plurality of kinds of gradations or color tones similar to gradations or color tones utilized in display game characters in a first game machine on the basis of image display data stored in a ROM contained in a cartridge for first game machine. The image data processed by the CPU is transferred to a second game machine in a manner that the image data is in conformity with a format and a timing for controlling display in the second game machine. Furthermore, commands by which necessary data are inputted in converting various kinds of data for the first game machine into various kinds of data for the second game machine are represented by illustrations or symbols (command characters), so that the necessary data can be inputted through selection of the symbols.

6 Claims, 19 Drawing Sheets

GAME SIGNAL CONVERSION APPARATUS

BACKGROUND OF THE INVENTION

1. Field of the Invention

The present invention generally relates to a game signal conversion apparatus. More specifically, the present invention relates to a game signal conversion apparatus which makes a cartridge for a first game machine usable in a second game machine having a processing ability for image display such as the number of colors, speed and etc. which is different from the processing ability of a first game machine.

2. Description of the Prior Art

Exemplary prior art game machines include: an 8-bit hand-held game machine with liquid crystal display which displays a game image in gradation with utilizing a monochrome dot-matrix liquid crystal display (e.g. "GAME BOY" which is manufactured and sold by the same assignee as that of the present invention), an 8-bit television game machine (e.g. "FAMILY COMPUTER" or "Nintendo ENTERTAINMENT SYSTEM" which is manufactured and sold by the same assignee as that of the present invention), and a 16-bit television game machine (e.g. "SUPER FAMICON" or "SUPER Nintendo ENTERTAINMENT SYSTEM" which is manufactured by the same assignee as that of the present invention). In the above described 8-bit television game machine, in displaying an image of one character, one of four (4) colors can be designated for each dot of the character, and by combining color tone data designating one of the four colors and color palette data, it is possible to display the image with a maximum 54 (fifty-four) colors for a whole screen. In contrast, in the above described 16-bit television game machine, by changing a mode, it is possible to select the number of colors capable of being utilized in displaying an image of one character out of 4-color, 16-color and 256-color, and therefore, it is possible to select 256 colors for a whole screen out of 32768 colors at maximum by combining data for designating a color tone (color tone data) and color palette data.

In the conventional game machines, there was no compatibility for game software between game machines having processing abilities (e.g. the number of bits, the processing speed, the number of colors and etc.) of microprocessors or CPUs different from each other. Therefore, it was impossible to use a cartridge which stores a game program developed for a given kind of game machine in another kind of game machine even if a form or dimension of the cartridge for the given kind of game machine is made equal to a form or dimension of a cartridge for the other kind of game machine. For example, a cartridge for the game machine with dot-matrix liquid crystal display (e.g. the above described "GAME BOY") could not be applied to the television game machines capable of displaying the image in color (e.g. the above described "FAMILY COMPUTER" and "SUPER FAMICON"). Furthermore, even if a CPU or microprocessor having the same number of bits is utilized, since character data stored in a memory (ROM) contained in the cartridge is only data for displaying the image in monochrome with gradation, it is possible to display the image with only a single color having a plurality of gradations. Furthermore, a cartridge for the 8-bit television game machine could not be utilized in the 16-bit television game machine even if the form of the cartridge, the number of pins and an arrangement of the pins of the cartridge for the 8-bit television game machine are made the same as that of a cartridge for the 16-bit television game machine because the structure of data for designating the color or color tone are different from each other.

On the other hand, in a case where the cartridge for a given kind of game machine is used in another kind of game machine, in order to secure adaptability, it is necessary to change a portion of the specification of the cartridge. In such a case, it was difficult to input data for changing a portion of the specification. Especially, in a case of a game machine, the game machine has no keyboard in contrast with a personal computer, and therefore, data entry utilizing a game controller becomes complex, and operation thereof becomes troublesome.

SUMMARY OF THE INVENTION

Therefore, a principal object of the present invention is to provide a game signal conversion apparatus by which it is possible to make a cartridge programmed for a given kind of game machine be in conformity with another kind of game machine.

Another object of the present invention is to provide a game signal conversion apparatus by which in using a cartridge programmed for a first game machine which displays a monochrome image in a second game machine which is capable of displaying a color image, a color image can be displayed on the basis of image data which designates one of two or more kinds of gradations.

Another object of the present invention is to provide a game signal conversion apparatus by which in using a cartridge programmed for a first game machine having a lesser number of colors in a second game machine having a larger number of colors, it is possible to display a color image with desired combination of colors out of a maximum number of colors being usable in the second game machine.

A further object of the present invention is to provide a game signal conversion apparatus in which when a cartridge programmed for a given kind of game machine is made be in conformity with and used in another kind of game machine, an input operation for changing a portion of data or for inputting additional data becomes easy.

According to a game signal conversion apparatus of a first invention, a cartridge for a first game machine can be used in association with a second game machine which can display a game image with the number of colors that is designated by a plurality of kinds of color information and larger than the number of colors capable of being displayed by the first game machine. A first storage means contained in the cartridge for first game machine stores character data of a plurality of characters each of which is represented by two or more kinds of gradations or color tones for each dot, and display control data for controlling display of the plurality of characters, as image display data. The second game machine is used through connection to a color television, and the second game machine is constructed to include a second storage means and a color image signal (or color video signal) generating means. Then, the game signal conversion apparatus includes a connecting means for detachably being connected by the cartridge for first game machine, a color palette selecting means for selecting a color palette (described in corresponding to embodiments, in a case of a manual selection, a program stored in a system ROM 16 for executing steps S51–S57 shown in FIG. 22 and a CPU 13, and in a case of an automatic selection, a program stored in the system ROM 16 for executing steps S51 and S58–S66 shown in FIG. 22, the CPU 13 and a program stored in a storage area 216 of a ROM 21), and a color information writing means (a program stored in the system ROM 16 in the embodiment), and an image data generating means (an image data interface 14 in the embodiment).

According to a game signal conversion apparatus of a second invention, a cartridge for first game machine, the first game machine including a first processing means and a first storage means, becomes to be used in association with a second game machine which executes a game different from a game capable of being executed by the first game machine by processing second image display data by a second processing means which is different in kind from the first processing means. The first storage means stores in advance character data of a plurality of characters and display control data for controlling display of the plurality of characters, as a first image display data. The second game machine is used through connection to a color television, and the second game machine is constructed to include a second storage means, an image signal generating means, and an operation means. Then, the game signal conversion apparatus includes a third processing means, an image data transfer means, a window display means, a command code generating means, and an image data generating means.

In the first invention, the cartridge for first game machine is connected to the connecting means of the game signal conversion apparatus. Prior to a start of game, by designating a color for each of two or more kinds of gradations or color tones by the color palette selecting means, a color palette for displaying an image with combination of a plurality of color information equal to the number of kinds of the gradations or color tones of a single character is selected. Data of a selected color palette is written into the second storage means included in the second game machine by the color information writing means. Then, after the start of game, the character data and the display control data stored in the first storage means are read-out. The image data generating means generates, on the basis of the character data and the display control data, image data for designating one of two or more kinds of gradations or color tones similar to that of the first game machine for each dot of the character. In response to the image data for each dot, in the second game machine, the color image signal generating means generates, on the basis of the image data for specifying the two or more kinds of gradations or color tones and the color palette data stored in the second storage means, a color image signal (a color video signal) equal to color information selected from a large number of kinds of color information in corresponding to the two or more kinds of gradations or color tones.

In the second invention, the cartridge for first game machine is connected to the connecting means. Prior to a start of game, in order to input data necessary for making the cartridge for first game machine be in conformity with the second game machine, the window display means displays a window on a screen of a color television, and command characters utilized for inputting the data within the window. When a command character is selected through an operation of the operation means, the command code generating means generating a command code corresponding to a selected command character and applies the same to the second processing means. Then, after the start of game, the character data and the display control data stored in the first storage means are read-out. The third processing means has a processing ability as the same as that of the first processing means included in the first game machine, and the third processing means processes the first image display data stored in the first storage means so as to generate the first image data. The image data transfer means supplies the first image data to the second processing means included in the second game machine so that the second image data utilized for controlling display by the second game machine can be generated. In association therewith, the image data generating means generates, on the basis of the character data and the display control data stored in the first storage means of the cartridge for first game machine, image data which designates one of the two or more kinds of gradations or color tones similar to that of the first game machine, and applies the image data to the second processing means. In response to the image data, in the second game machine, the second processing means processes the second image data, and stores data to be processed or data after processed in the second storage means. The image signal generating means generates an image signal on the basis of the second image data so as to supply the image signal to the television.

In accordance with the first invention, a cartridge programmed for a given kind of game machine can be used in another kind of game machine. Furthermore, since the cartridge programmed for the first game machine which displays an image with two or more kinds of gradations or color tones is used in the second game machine which can display an image with a larger number of colors, it become possible to display the image with a various kinds of colors.

In accordance with the second invention, in a case where a cartridge programmed for a given kind of game machine is used in another kind of game machine, the data entry in inputting the data necessary for changing a portion of the specification becomes easy. Especially, the data can be inputted by selecting the command character with utilizing the window display, without keyboard, it is possible to simply and rapidly input the data necessary for changing the specification with utilizing only the operation means of the game machine.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
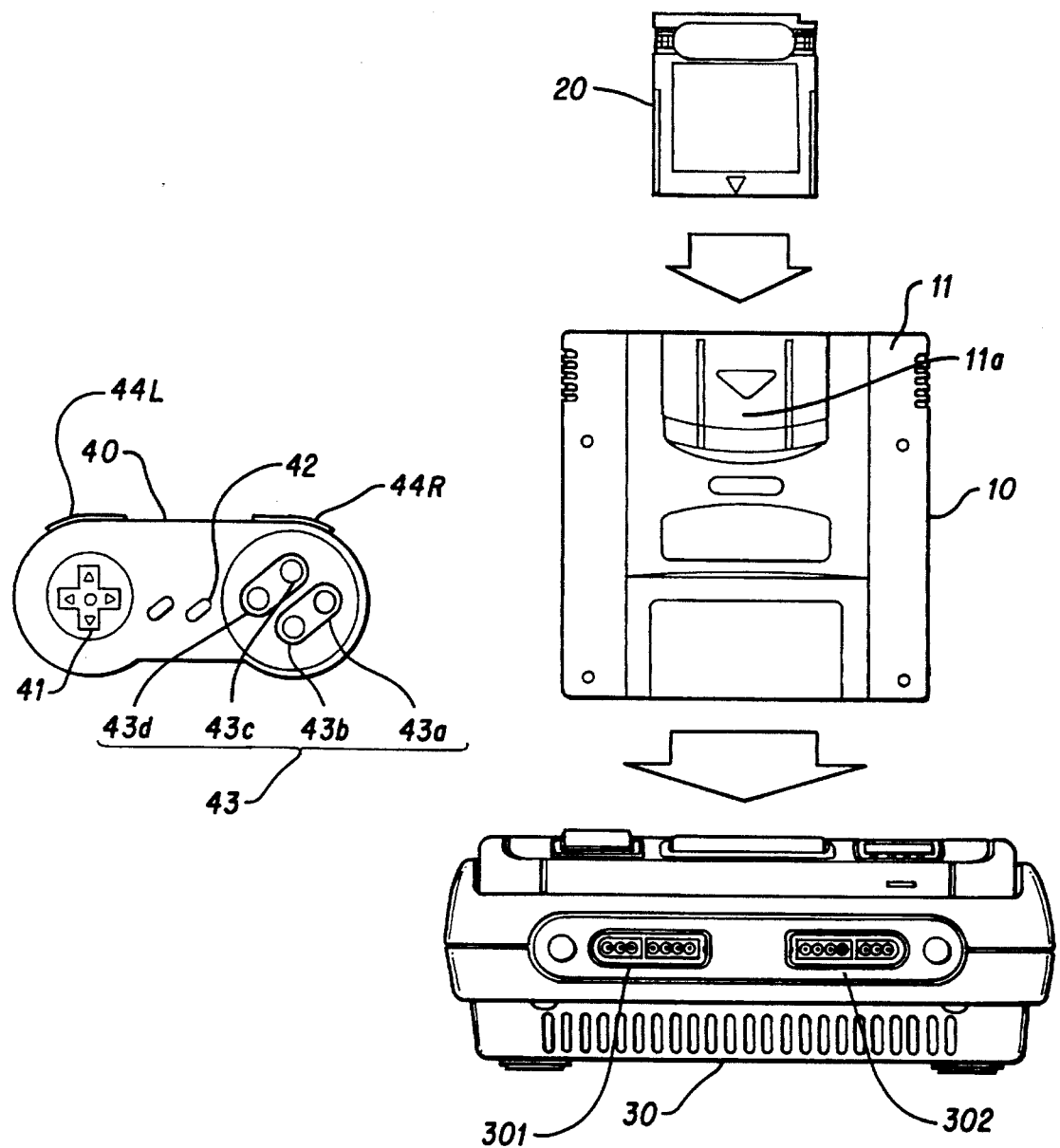
FIG. 1 is an appearance view of a whole system showing a used state of a game signal conversion apparatus according to the present invention.

FIG. 1 is an appearance view showing a whole system of a used state of a game signal conversion apparatus according to the present invention. In FIG. 1, to the game signal conversion apparatus according to the present invention (so-called "adapter for game machine", and hereinafter, may be simply called as "adapter") 10, a cartridge 20 for first game machine (e.g. a hand-held game machine with dot-matrix liquid crystal display manufactured and sold by the same assignee as that of the present invention, "GAME BOY") is detachably attached from an upper side thereof. To this end, the adapter 10 has an insertion port 11a which is formed an upper portion of a front surface of a housing 11 and for receiving the cartridge 20, and a connector (shown by a reference numeral 12 in FIG. 2) is formed in the insertion port 11a. The connector 12 is mounted on a circuit board (not shown) which is contained in the adapter 10. Furthermore, on the circuit board, a plurality of electronic components 13–16 which are surrounded by a reference numeral 10 in FIG. 2 (described later) are mounted.

Then, the adapter 10 is inserted into a cartridge insertion port of a second game machine (e.g. a 16-bit television game machine for home use manufactured and sold by the same assignee as the present invention, "SUPER FAMICON" or "SUPER NES"), and connected to a connector provided at the cartridge insertion port so as to be used in the second game machine in a state where the cartridge 20 is attached to the adapter 10.

The game machine 30 is connected to a color display device such as a color television receiver, CRT or the like (not shown, and hereinafter, may be simply called as "monitor"), and the game machine generates a color image signal or color video signal to be applied to the monitor. On a front surface panel of the game machine 30, a first slot (or connector) 301 and a second slot (or connector) 302 are formed. To the slots, an operation device 40 for entering data for game operation or commands (the operation device may be called as a controller, and may be a joy-stick), or a coordinates input device (so-called as "mouse") is connected.

Figure 2:
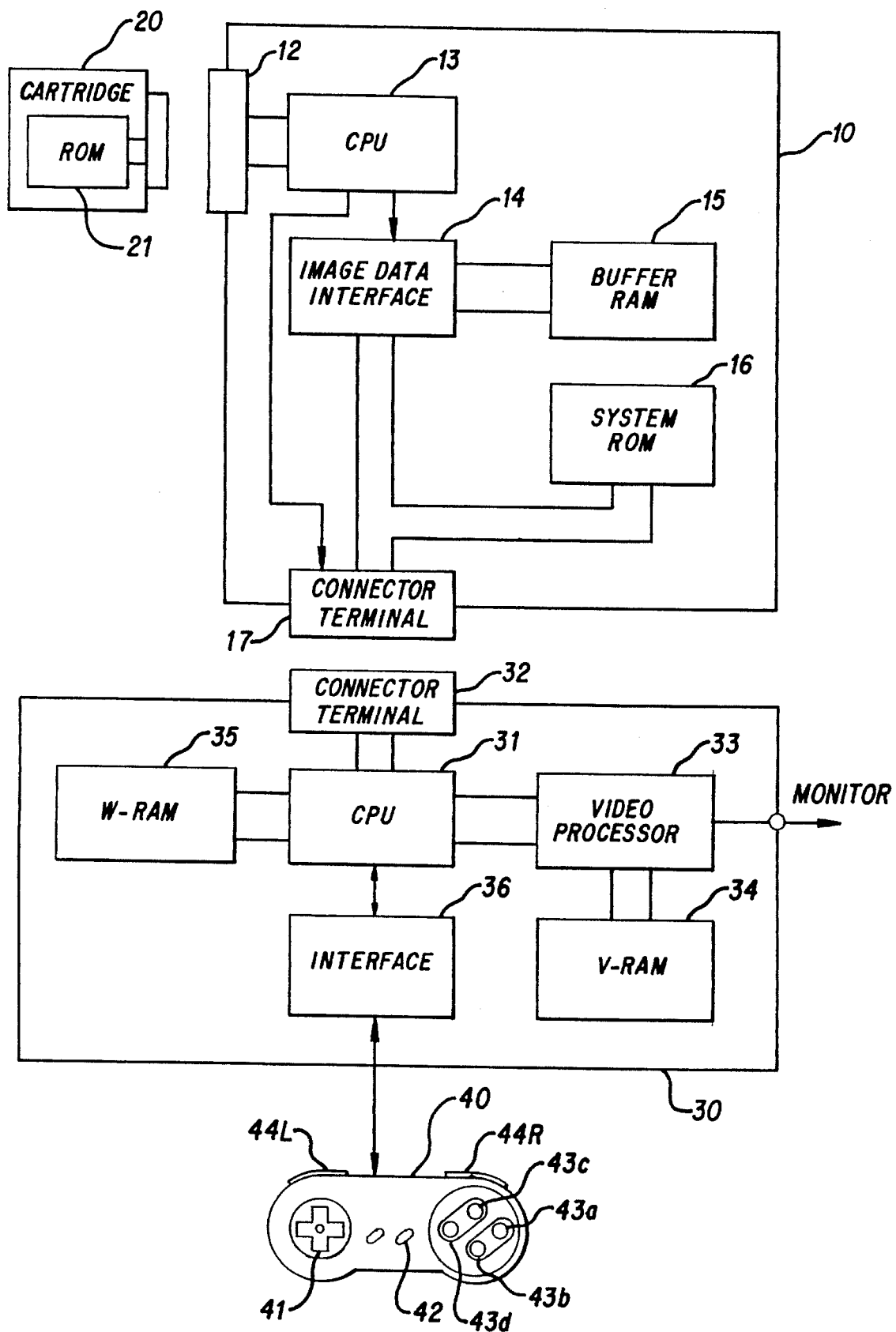
FIG. 2 is a block diagram showing the whole system in which the game signal conversion apparatus according to the present invention is applied.

FIG. 2 is a block diagram showing a whole system to which the adapter 10 according to the present invention is applied. The adapter 10 contains therein a CPU 13 having the same ability or performance as that of an 8-bit CPU (not shown) used in a first game machine (not shown) to which the cartridge 20 is originally applied, and a meaning of the CPU includes not only a central processing unit called in general as a CPU but also an IC or unit dedicated by image processing or video signal processing. If the first game machine is a game machine with monochrome liquid crystal display, the CPU 13 generates a graded image data (hereinafter, called as "gradation data"), and if the first game machine is an 8-bit television game machine, the CPU 13 generates a color-toned image data, whereby the CPU 13 functions as a image data generating means. The CPU 13 is connected to the connector 12 via a data bus and an address bus. To the CPU 13, a digital image data interface (hereinafter, simply called as "image data interface") 14 which is one example of a image data transfer means is connected. To the image data interface 14, a buffer memory (hereinafter, called as "buffer RAM") 15 is connected, and further, a system ROM 16 and a connector connection terminal 17 are connected via the data bus and the address bus.

Figure 3:
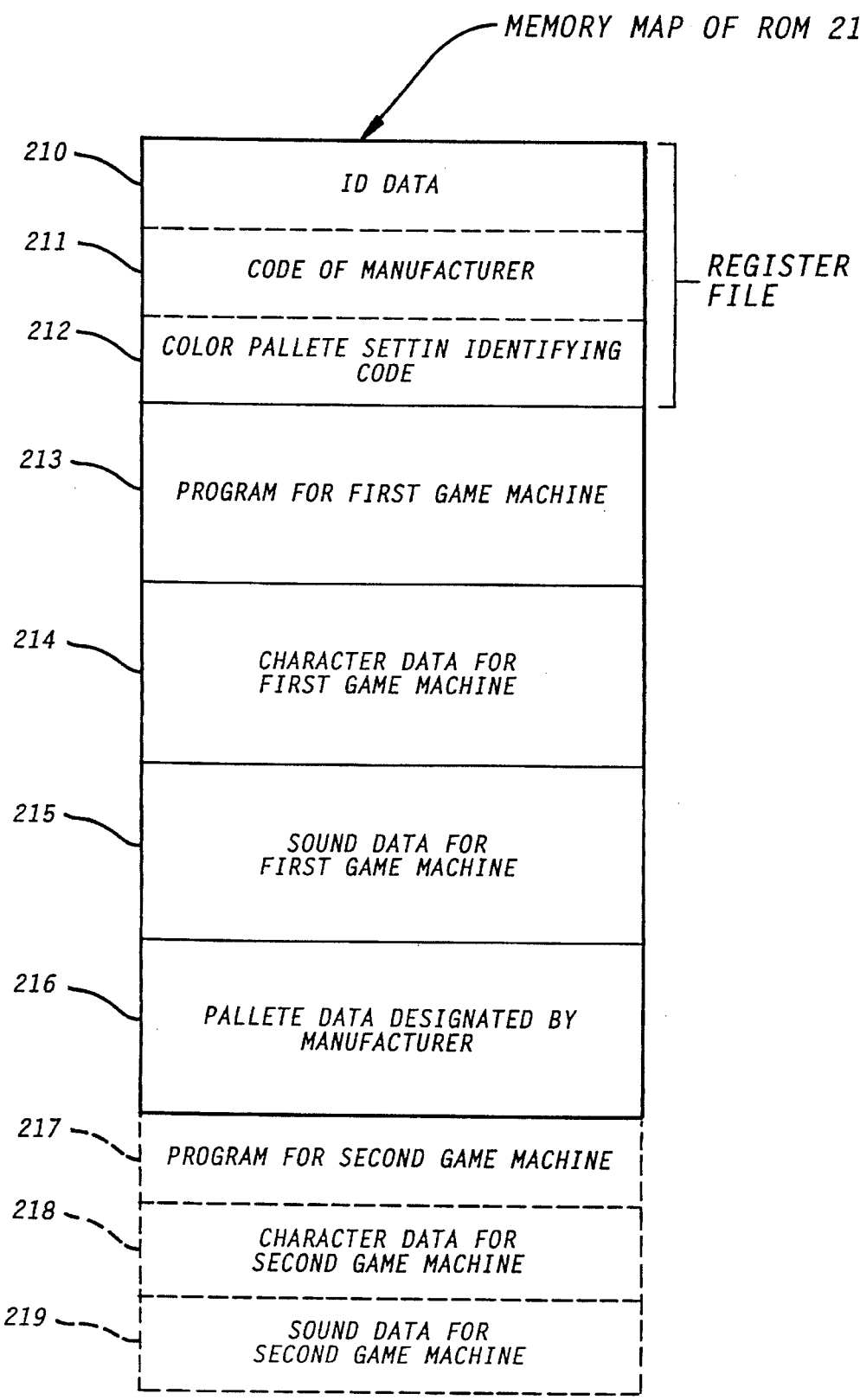
FIG. 3 is an illustrative view showing a memory map of a program ROM 21.

The cartridge 20 attached to the adapter 10 contains therein a non-volatile memory (e.g. a read-only-memory, hereinafter, called as "ROM") 21 which is one example of a first storage means. The ROM 21 includes a plurality of storage areas 210–219 as shown in a memory map of FIG. 3.

The storage areas 210, 211 and 212 ape areas for storing data (register file) for making the cartridge 20 to be applied to the adapter 10. For example, the storage areas 210–212 store ID data which is used fop determining an authenticity of the cartridge 20 in starting an operation (in turning-on a power source), a code of a manufacturer of the cartridge 20, and a color palette setting identifying code, respectively.

The storage areas 214 and 213 are storage areas for storing image display data for a monochrome display, and store at least character data of a plurality of characters for game and program data for controlling display of the plurality of characters. More specifically, each of the characters is constituted by 8×8 dots, and therefore, the storage area 214 stopes the character data of a single character by gradation data representative of four kinds of gradations by 2 (two) bits fop each dot. For example, black, dark gray, light gray and white are represented by the gradation data of "11", "10", "01" and "00", respectively. Therefore, the storage area 214 of the ROM 21 has a storage capacity of 16 times the number of characters capable of being displayed at maximum because an area of twice 8 bits×8 byte (16 byte) is required for the single character.

Furthermore, in the storage area 215, sound data for producing music and effective sounds for the first game machine are stored.

Furthermore, in a case of a game cartridge programmed so as to be applied to the adapter 10 of this embodiment shown, that is, in a case where it is unnecessary for a user or game player to manually select a color palette because the color palette can be automatically selected by the program, in addition to the above described storage areas 213–215, a storage area 216 is assigned in the ROM 21. In the storage area 216, one or plurality of color palette data and color information for designating colors corresponding to respective color palettes are stored. In such a case, the program may be designed such that not only the color palette data can designate only one kind of color during the game but also the color palette can change the kind of color during the game, for example, for each stage or scene, whereby it is possible to display the characters with colors of the apparently increased number.

Furthermore, in order to store program data (character data and character display control data) and sound data (PCM data) for the second game machine 30 in addition to the data for the first game machine, storage areas 217–219 may be further assigned in the ROM 21.

Furthermore, in order to store back-up data as necessary, a RAM (not shown) may be provided in the cartridge 20.

In addition, in a case where the first game machine is the above described 8-bit television game machine, data representative of 4 (four) kinds of color tones can be considered as the above described gradation data representative of 4 (four) kinds of gradations, and therefore, it is possible to display a character in color with 54 colors at maximum (4 color tones×13 palettes, and white and black) by combination of the color tone data and the color palette data. In a case where such a cartridge (not shown) for 8-bit television game machine is applied to the second game machine 30, 13 (thirteen) kinds of color palette data are stored in advance in a ROM contained in the cartridge for first game machine; however, in addition to that, additional color palette data are stored in the system ROM 16. Resultingly, even if the color tone data are only 4 (four) kinds, by increasing the kinds of color palette data, it is possible to display the image with the number of colors as the same as the number of colors used in the second game machine 30.

Figure 4:
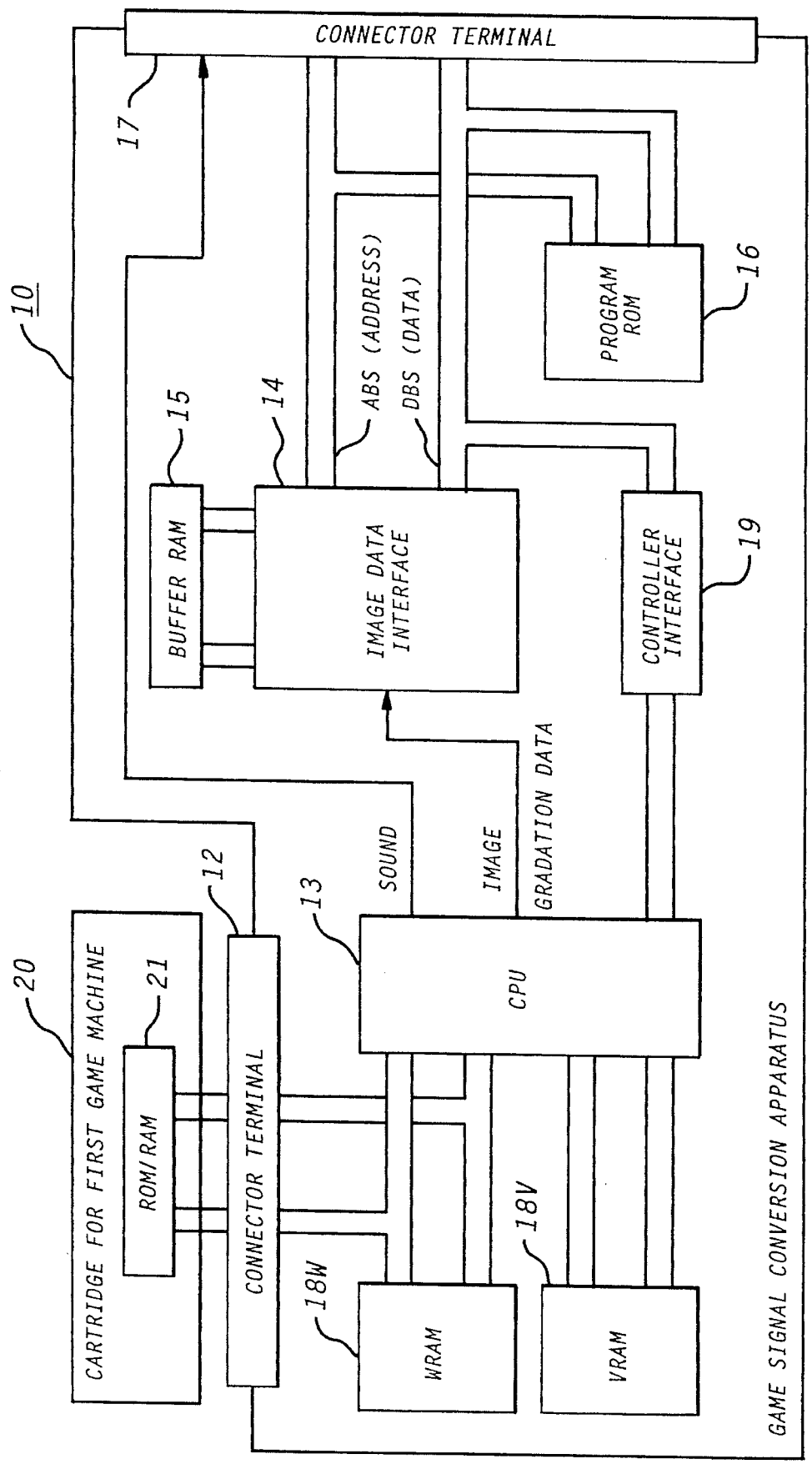
FIG. 4 is a block diagram showing in detail a game signal conversion apparatus 10 of one embodiment according to the present invention.

FIG. 4 is a block diagram showing in detail the adapter 10. In FIG. 4, to the CPU 13, a working memory (e.g. a writable/readable RAM, hereinafter, called as "W-RAM") 18w and a video RAM (hereinafter, called as "V-RAM") 18v are connected. The W-ROM 18w is a memory for temporarily storing data for game-processing such as calculation of score, moving display of the characters, operated status of the game controller and etc., the gradation data as transferred, the color palette data transferred from the ROM 21 or inputted by the user or game player. The V-RAM 18v is a memory for temporarily storing a background image in a text system in image-processing for displaying the game image by the CPU 13.

Then, the CPU 13 generates gradation data composed of a plurality of gradations for each character on the basis of the image display data stored in the ROM 21 contained in the cartridge 20, and outputs the gradation data to the image data interface 14 in synchronous with timings for displaying the character on the dot-matrix liquid crystal display.

A buffer RAM 15 for temporarily storing image data processed for the first game machine by the CPU 13, for example, the gradation data for each dot is connected to the image data interface 14. The buffer RAM 15 is used for synchronization adjustment between a timing that the CPU 13 generates the gradation data for the first game machine and a timing that the character is displayed in the second game machine 30. On the assumption that a storage capacity capable of storing the gradation data for 20 (twenty) characters, for example, is 1 (one) block, the V-RAM 15 has a storage capacity of 4 (four) blocks. Furthermore, the CPU 13 outputs a sound signal on the basis of sound source data stored in the ROM 21, and applies the same to a sound signal output terminal of the connector terminal 17. For generating or producing the image data and the sound signal by the CPU 13, techniques discloses in Japanese Patent Laying-open No. 2-210562 (corresponding to U.S. Pat. No. 5,134, 391) and Japanese Patent Application Laying-open No. 2-184200 (corresponding to U.S. Pat. No. 5,095,798) may be utilized.

The image data interface 14 makes the gradation data to be stored in the buffer RAM 15 temporarily, and controls read-out of the gradation data of one block for each interrupt signal from a CPU 31, whereby the gradation data generated in synchronization with a display timing of the liquid crystal display can be transferred to a W-RAM 35 from the buffer RAM 15 via a data bus, an address bus and the connector terminal 17, and therefore, the gradation data can be outputted from the second game machine 30 in synchronization with raster scanning of the monitor.

Furthermore, the system ROM 16 is further connected to the data bus and the address bus. The system ROM 16 stores a program which is executed by the CPU 31 included in the second game machine 30 and for converting the gradation data for the first game machine into image display data capable of being applied to the second game machine 30, a program for inputting data with window display, and other programs (e.g. a program for executing an operation shown by flowcharts of FIG. 19–FIG. 23).

Furthermore, to the data bus, a controller interface 19 is connected, and an output of the controller interface 19 is applied to the CPU 13. The controller interface 19 plays a role that the data indicating an operation status of the operation device or controller 40 in the game mode is transferred to the CPU 13.

Figure 5:
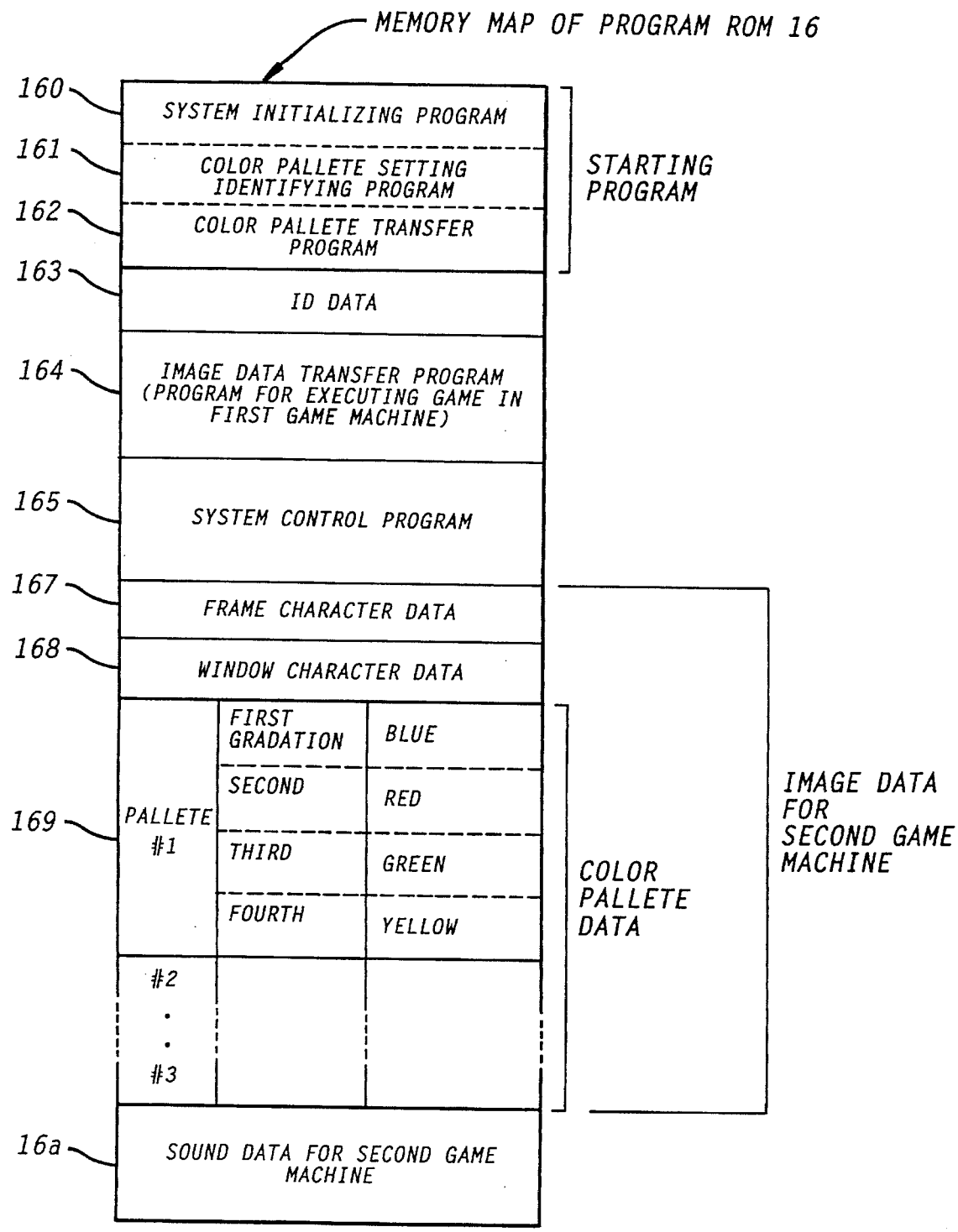
FIG. 5 is an illustrative view showing a memory map of a system ROM 16.

FIG. 5 shows a memory map of the system ROM 16. With referring FIG. 5, data stored in the system ROM 16 will be described in detail. The system ROM 16 is a memory for storing a system program for the CPU 31, and includes a plurality of storage areas 160–16a. The storage areas 160–163 are areas for storing a starting program such as a system initialization program, an identifying program, a color palette data transferring program, and an ID data. The storage area 184 stores a transfer program of the image data. The storage areas 165 stores a system control program shown in FIG. 20 and FIG. 21 (described later). The storage area 165 also stores data for displaying frames of a monitor screen 51 and a game window 52 (described later). The storage area 166 stores dot data of command characters displayed within frames of windows A–H (described later). The storage area 167 is for storing a plurality of palette data, and stores the color information for designating the color to be in conformity with respective gradations of respective palette numbers, for example. Therefore, by making combination of the color information stored in corresponding to the respective gradations be different from each other, it is possible to change combination of colors displayed on the monitor through the image processing of the second game machine 30. Stored data of the storage areas 168–169 are utilized as the image data for second game machine.

Furthermore, in a case where it is necessary to generate effective sounds or music other than that of the game of the cartridge 20 at a timing that designation of the color palette and/or display of the windows are performed, sound data for the second game machine may be stored in the storage area 16a.

Turning back to FIG. 2, the data bus and the address bus of the second game machine 30 are connected to a connector 32. The connector terminal 17 of the adapter 10 is detachably connected to the connector 32 such that the CPU 31 and the image data interface 14 are connected to each other. To the CPU 31, a video processor 33 for generating a signal for displaying a color image on the monitor (a color image signal or a color video signal) is connected. A color image signal generating means is constituted by the CPU 31 and the video processor 33.

The V-RAM 34 is connected to the video processor 33. When a game is to be played with utilizing a cartridge (not shown) for the second game machine 30, since a background image is displayed in the text system, the V-RAM 34 stores character codes in corresponding to display coordinates positions on the screen of the monitor. When a game is to be played with utilizing the cartridge 20, the V-RAM 34 stores the gradation data and the color palette data.

Figure 6:
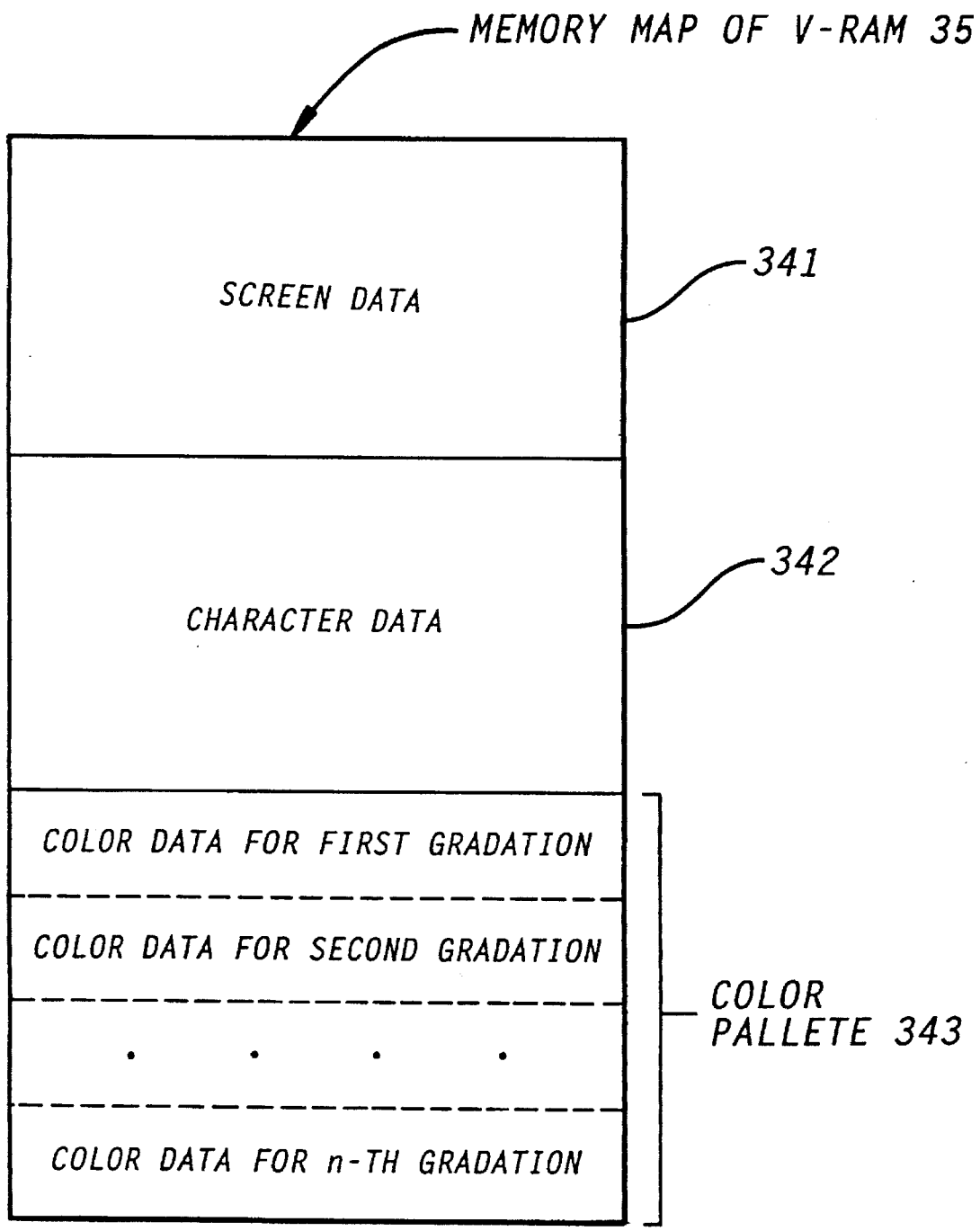
FIG. 6 is an illustrative view showing a memory map of a V-RAM 34.

Furthermore, the W-RAM 35 is connected to the CPU 31. The color palette data are, as shown by a memory map of the V-RAM 34 in FIG. 6, the color information (or color codes) for designating the colors corresponding to the respective gradations so as to designate the colors in corresponding to the gradations 1–4, and the color palette data are stored in the color palette storage area.

Figure 7:
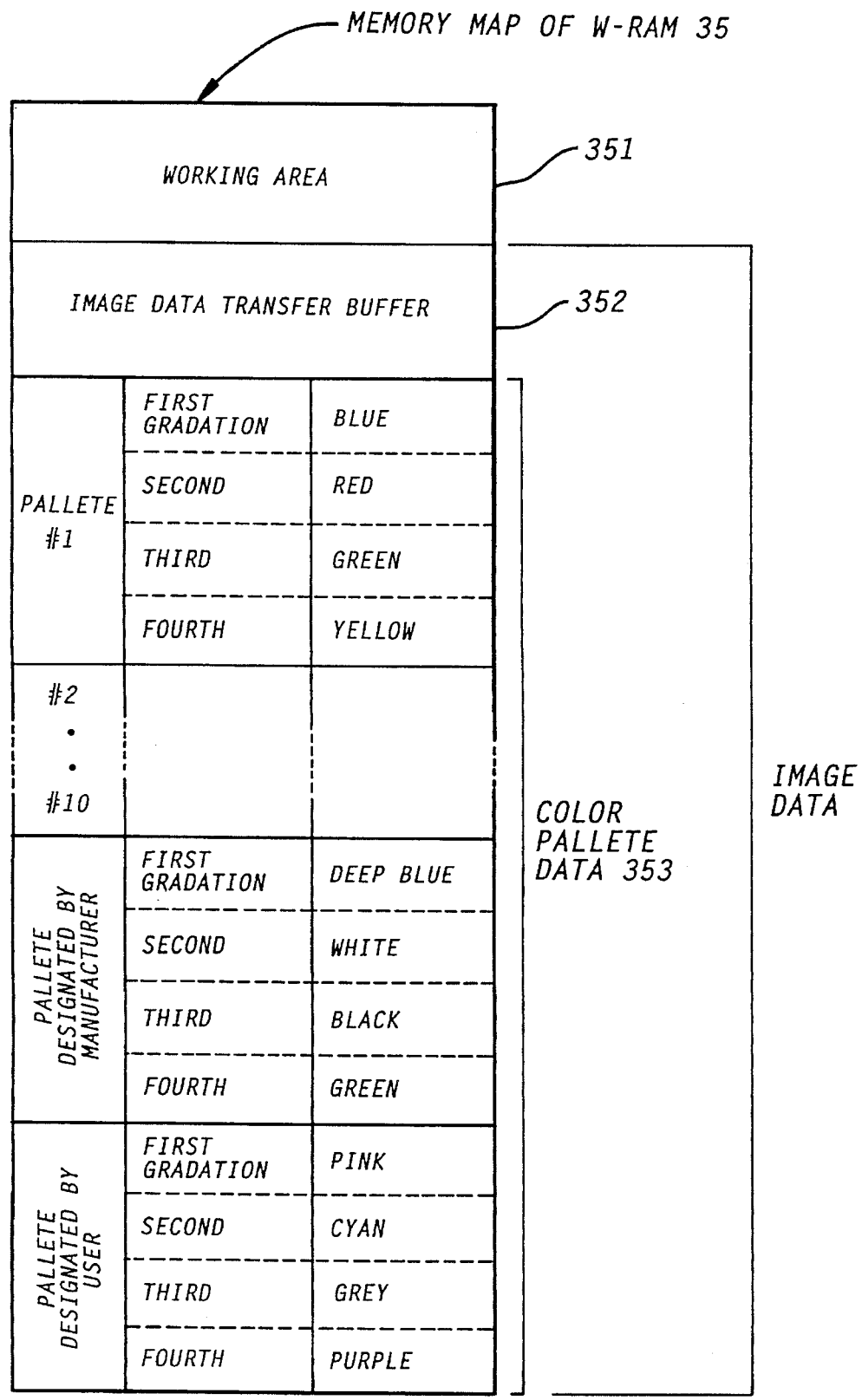
FIG. 7 is an illustrative view showing a memory map of a W-RAM 34.

The W-RAM 35 includes storage areas 351–353 as shown by a memory map in FIG. 7. The storage area 351 is utilized as a working area for temporarily storing data processed or to be processed for game processing. The storage area 352 is utilized as an image data transfer buffer for temporarily storing the gradation data for game display, which are transferred from the buffer RAM 15 during a vertical blanking period. The gradation data temporarily stored in the storage area 352 are transferred to the V-RAM 34 by the CPU 31 during the vertical blanking period. The storage area 353 is utilized as the color palette data storage area. The storage area 353 stores the color information corresponding to the 4 (four) kinds of gradations for each of the palette numbers as similar to the storage area 169 shown in FIG. 5, and more preferably, the palette data designated by the manufacturer of the cartridge 20, and the palette data set by the user or game player.

Furthermore, to the CPU 31, the controller (operation device) 40 is connected through an interface 36. As the controller 40, the art described in Japanese Utility Model Laying-open No. 4-56616 (corresponding to U.S. Pat. No. 5,207,426) can be utilized. More specifically, as shown in FIG. 1 in detail, the controller 40 includes a directional switch 41, a start switch 42, a plurality of action switches 43 (in the later, if it is necessary to identify each of A–D buttons, reference numerals 43a–43d are utilized), a left switch 44L and a right switch 44R. In the game mode, the directional switch 41 is utilized for designation of a moving direction of a moving character (a hero character controlled by the game player), selection of commands during the game, and etc., and the action switches 43 are utilized for designation of kinds of action of the moving character in the game mode, and the left switch 44L and the right switch 44R are utilized as auxiliary switches of the action switches in the game mode.

On the other hand, in an input setting mode, the directional switch 41 is utilized for designating a moving direction of a cursor, and the action switches 43 are utilized for deciding selection of the command character designated by the cursor, and the left switch 44L and the right switch 44R are utilized as a changing switch by which the mode is changed into the input setting mode through simultaneous depression of the switches 44L and 44R.

In addition, connectors (first and second slots 301 and 302) for connecting two controllers are provided on the second game machine 30; however, the controller may be connected to one of the connectors or slots, and the mouse may be connected to the other of the connectors.

Figure 8:
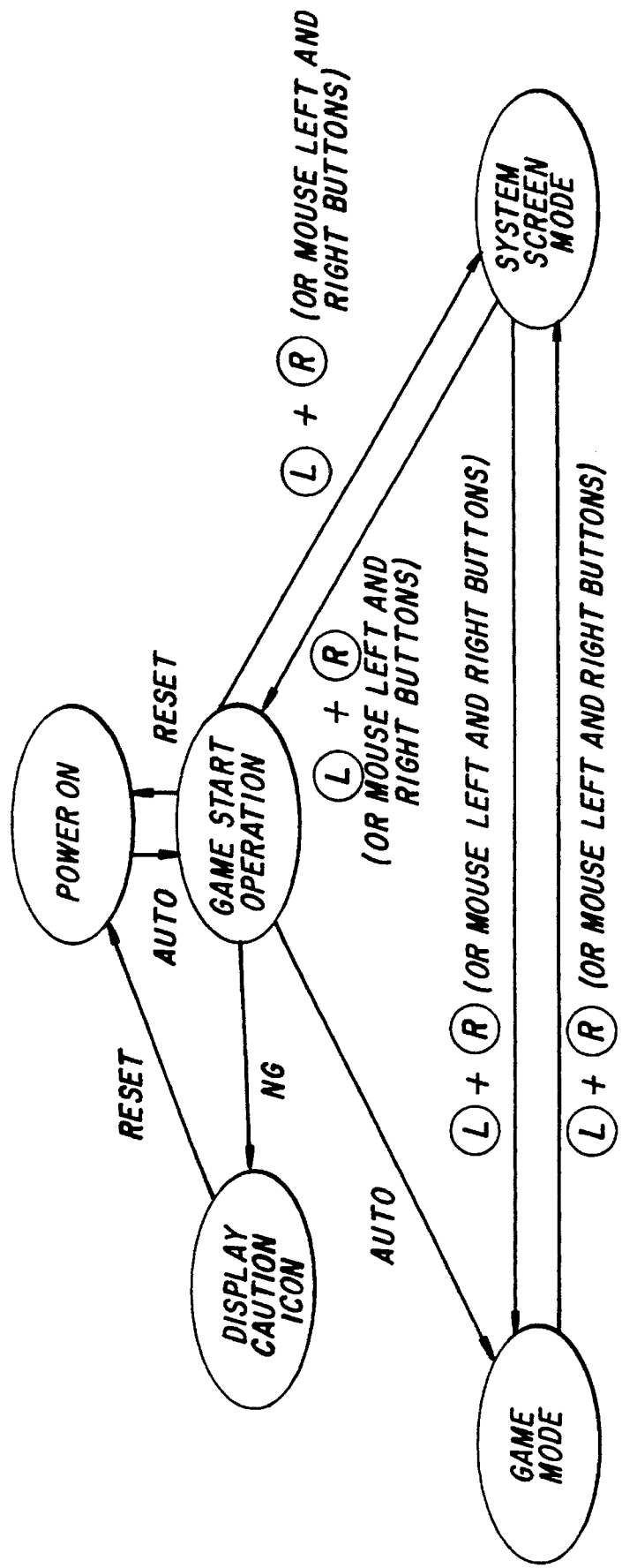
FIG. 8 is a status transition chart showing an operation of the embodiment in turning-on a power source especially.
Figure 9:
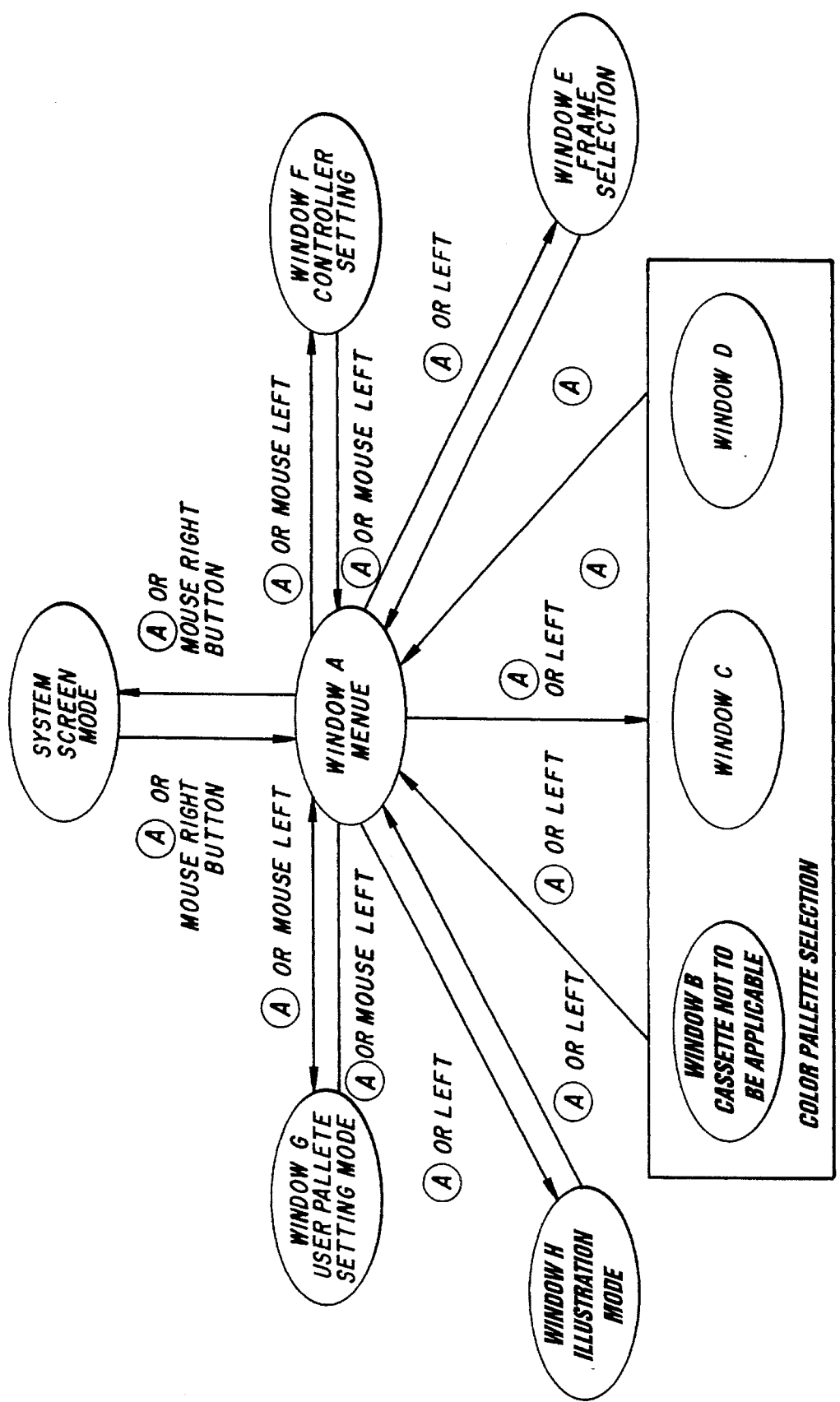
FIG. 9 is a status transition chart showing an operation of the embodiment at a time that the system is being operated especially.

FIG. 8 and FIG. 9 are status transition charts for explaining an operation of one of embodiment according to the present invention. Therefore, next, with referring FIG. 8 and FIG. 9, an operation of this embodiment shown will be described in summary.

In FIG. 9, after the adapter 10 to which the cartridge 20 is attached is loaded to the second game machine 30, when the power source switch (not shown) of the second game machine 30 is turned-on, a game starting operation is executed. At this time, in a case of a cartridge of a game software in which a program for automatically setting the color palette data is stored in the ROM 21, the color palette data are automatically written in the color palette data storage area of the V-RAM 34, and then, the game mode is executed.

Figure 10:
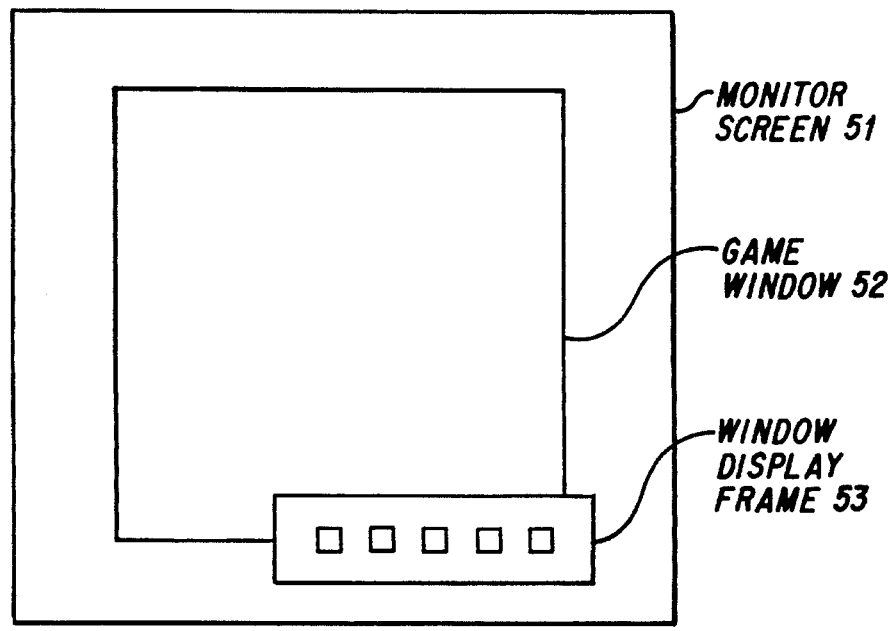
FIG. 10 is an illustrative view showing a display example of a whole screen of a monitor.

On the other hand, after the game starting operation, or when the left switch 44L and the right switch 44R are simultaneously depressed in the game mode, the process proceeds to a system screen mode. In the system screen mode, first, within a monitor screen (may be also called as "picture frame") 51 shown in FIG. 10, for example, a display area (hereinafter, called as "game window") 52 having longitudinal and lateral sizes similar to sizes of the first game machine, being smaller than sizes of the monitor screen 51, is displayed. In a case where the mouse is utilized instead of the controller 40, the process may proceed to the system screen mode at a time that two buttons of the mouse are simultaneously depressed.

In addition, in a case where the cartridge 20 attached to the adapter 10 is a cartridge which can not be used in the game system, a warning screen or caution screen is displayed in the game starting operation, and thereafter, the status returns to an operation at a time of turning-on of the power source in response to a reset signal.

Next, with referring FIG. 9, the system screen mode, i.e., the mode in which various kinds of commands and etc. are inputted and set through the window display will be described in summary.

Figure 11:
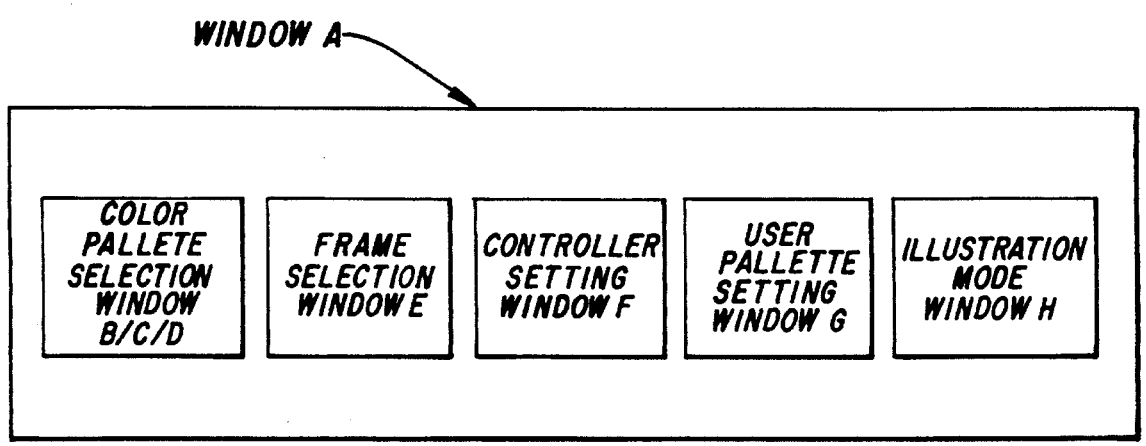
FIG. 11 is an illustrative view showing a display example of a screen of a window A.

When the action switch (A button, for example) 43a, or a left button in a case of the mouse, is depressed, below the game window 52, a window display frame 53 (see FIG. 10) is displayed in a overlapped manner. In the window display frame 53, first, a screen of the window A is displayed. In the window A, as shown in FIG. 11, for example, a plurality of commands input characters (illustrations or symbols representative of contents of the commands) in which icons are displayed are displayed. As the command input characters of the window A, the illustrations or symbols for selecting modes of a color pattern, a frame pattern, a controller setting, a color setting, and a picture painting and etc. are included.

Figure 12:
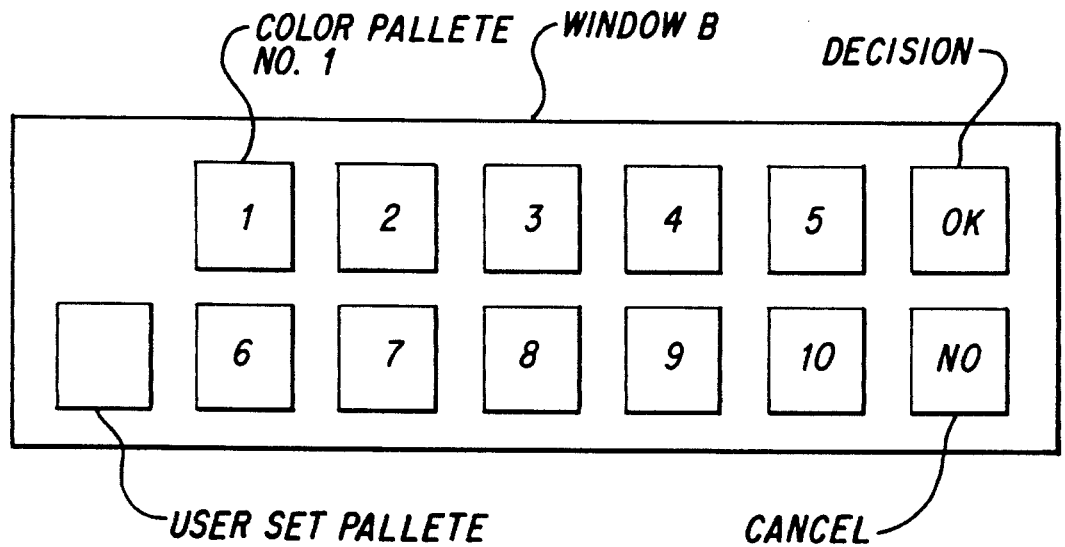
FIG. 12 is an illustrative view showing a display example of a screen of a window B.
Figure 13:
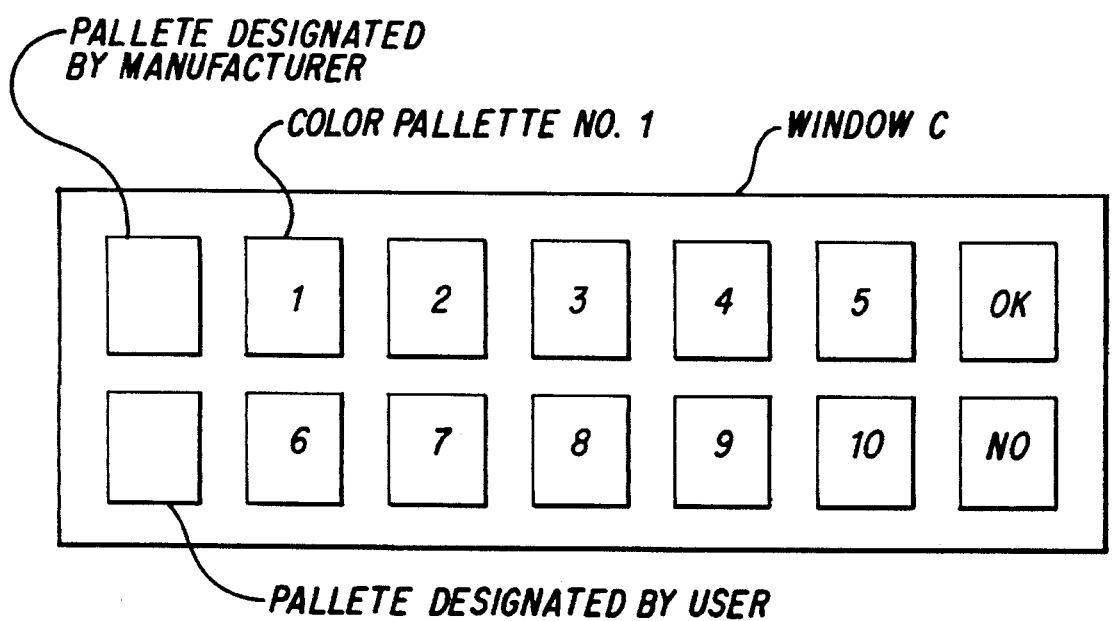
FIG. 13 is an illustrative view showing a display example of a screen of a window C.
Figure 14:
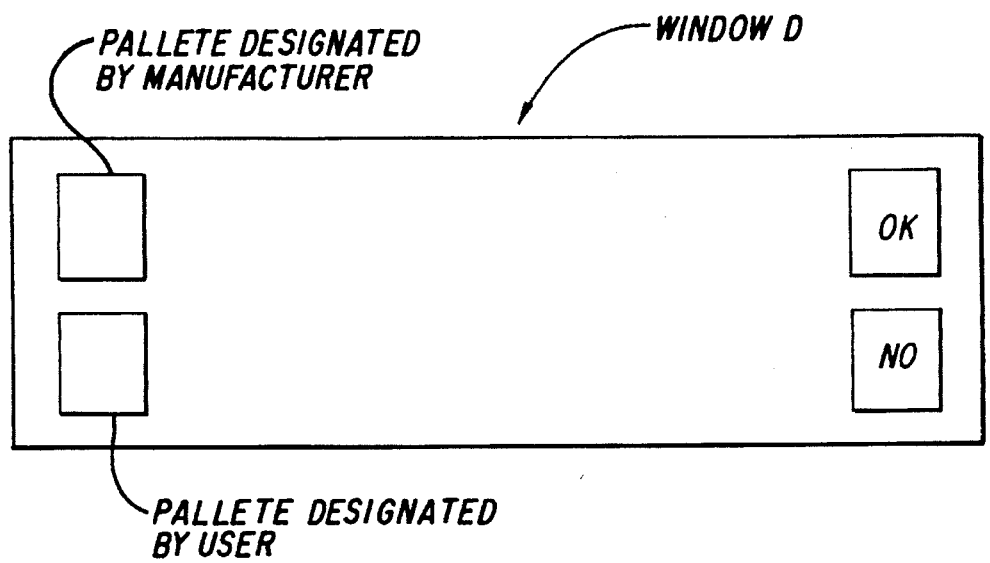
FIG. 14 is an illustrative view showing a display example of a screen of a window D.

The color palette is for selecting a mode for setting a color palette with utilizing different illustrations or symbols, and on the basis of such selection and the program in the ROM 21, a screen of the window B, C or D shown in FIG. 12, FIG. 13 or FIG. 14 is selected.

Figure 15:
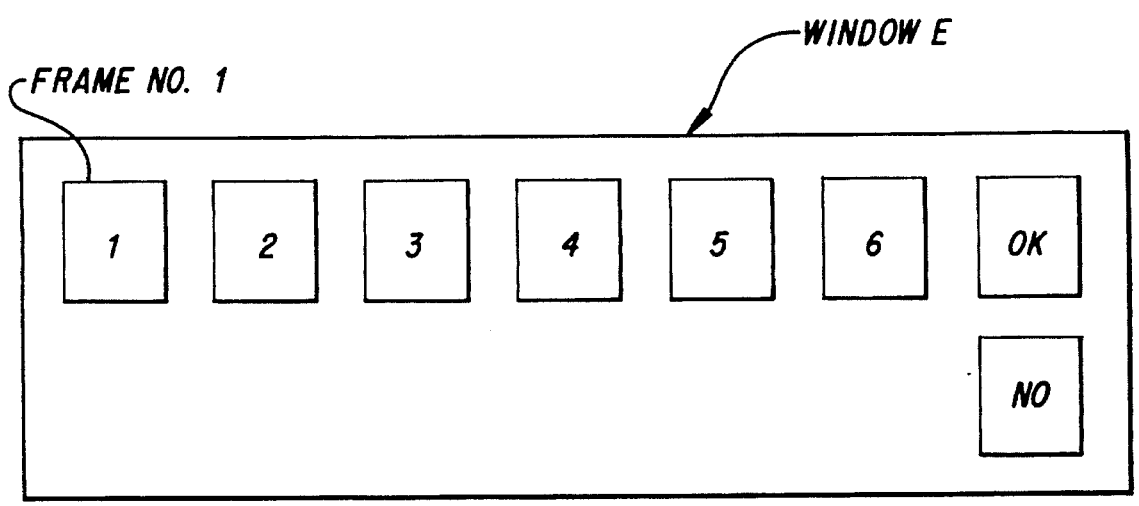
FIG. 15 is an illustrative view showing a display example of a screen of a window E.

The frame pattern is for selecting a mode in which an illustration of a frame pattern displayed in a portion of the monitor screen 51 except for the display frame 52 is changed by the user or game player through his design, and the frame pattern illustration can be designed by the user or game player, or the frame pattern illustration can be selected out of a plurality of illustrations, and on the basis of such selection, a screen of the window E shown in FIG. 15 is displayed.

Figure 16:
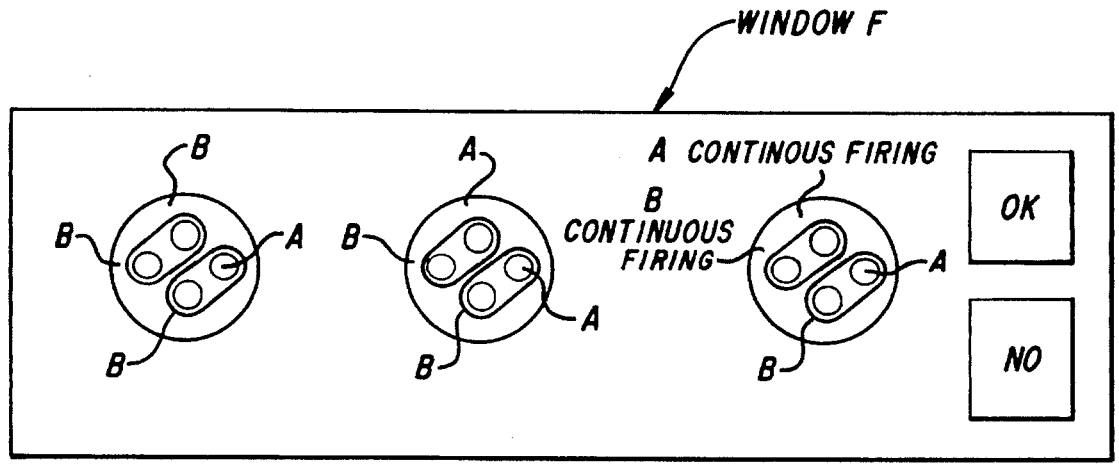
FIG. 16 is an illustrative view showing a display example of a screen of a window F.

The controller setting is for selecting a mode in which functions or meanings of the action switches 43a–43d included in the controller 40 (other switches 41, 42, 44R and 44L may be included as necessary) are arbitrarily set or changed, and on the basis of such selection, a screen of the window F shown in FIG. 16 is displayed. In the window F, functions of the respective switches of the action switch 43 can be designated as arbitrary functions by the user or game player so as to make the switches easy to use, and patterns of the action switches 43 and changed functions are displayed.

Figure 17:
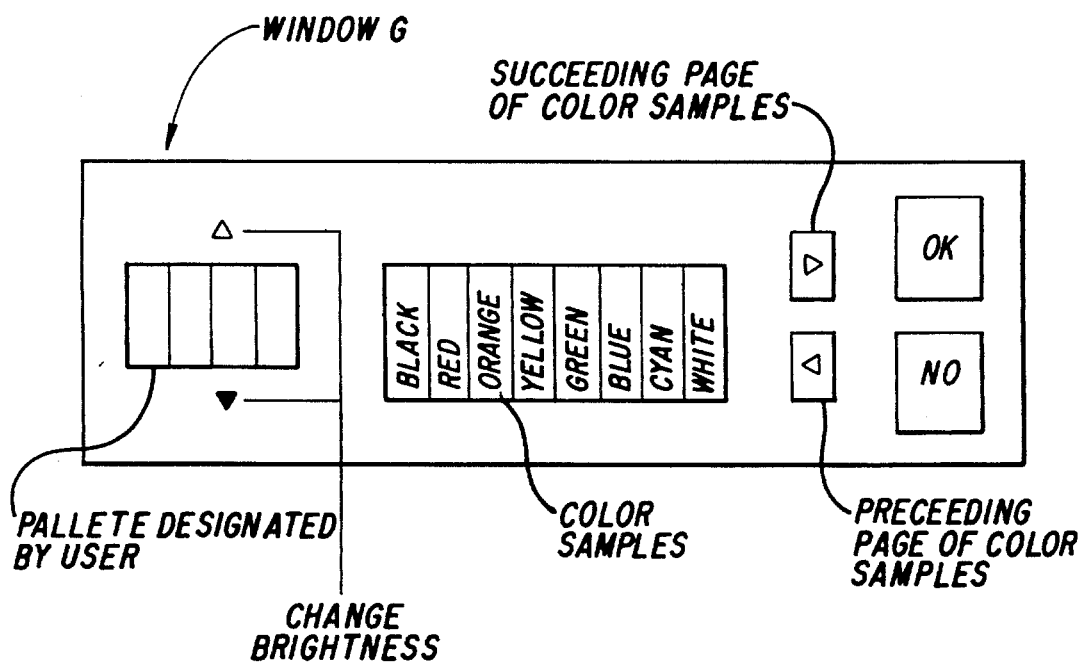
FIG. 17 is an illustrative view showing a display example of a screen of a window G.

On the other hand, the color setting is for selecting a mode in which combination of colors in the color palette is set, and a screen of the window G shown in FIG. 17 is displayed on the basis of such selection.

Figure 18:
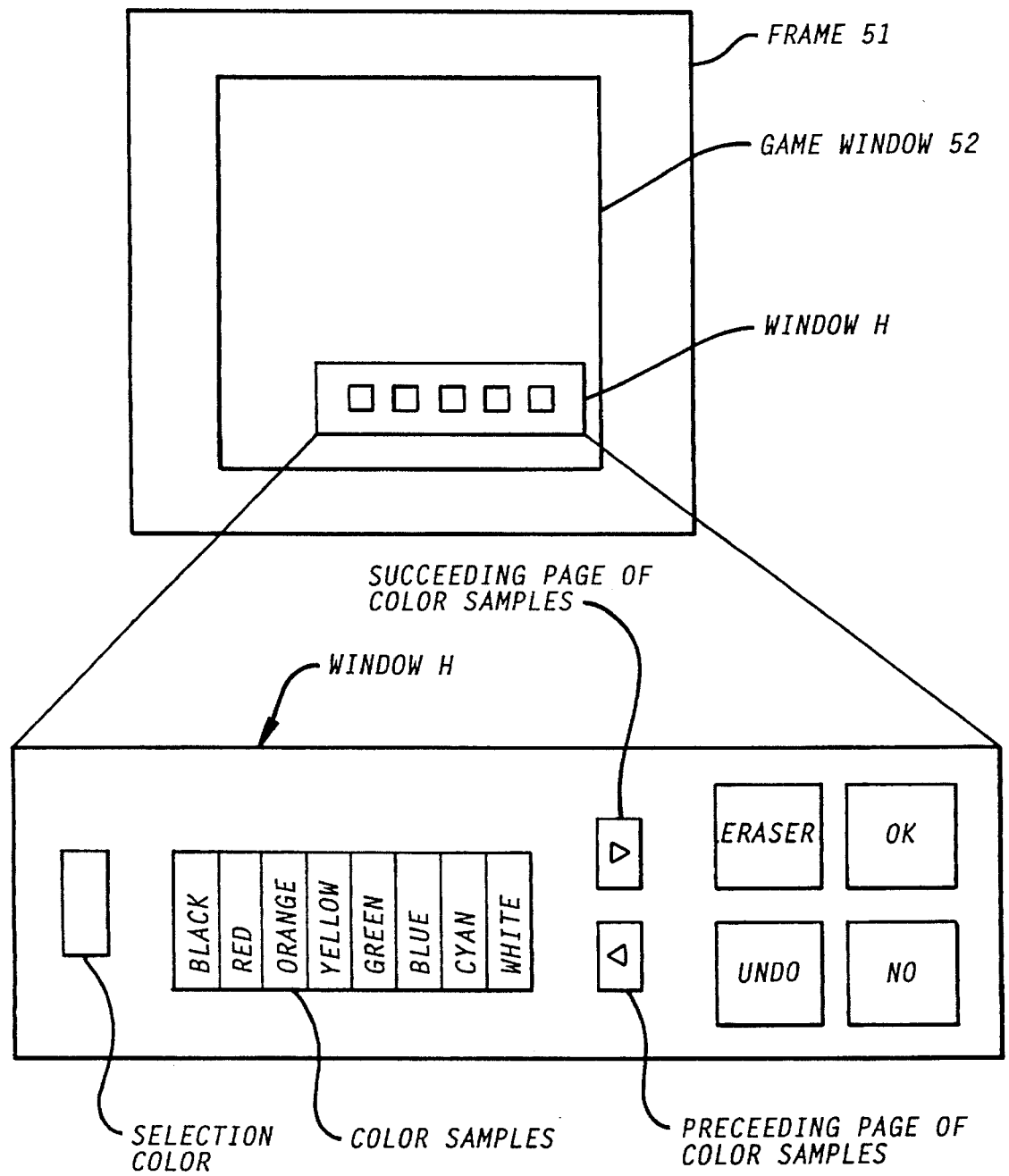
FIG. 18 is an illustrative view showing a display example of a screen of a window H.

The picture painting is for selecting a mode in which an arbitrary picture can be painted within the display frame 51 by the user or game player, and on the basis of such selection, a screen of the window H shown in FIG. 18 is displayed.

Figure 19:
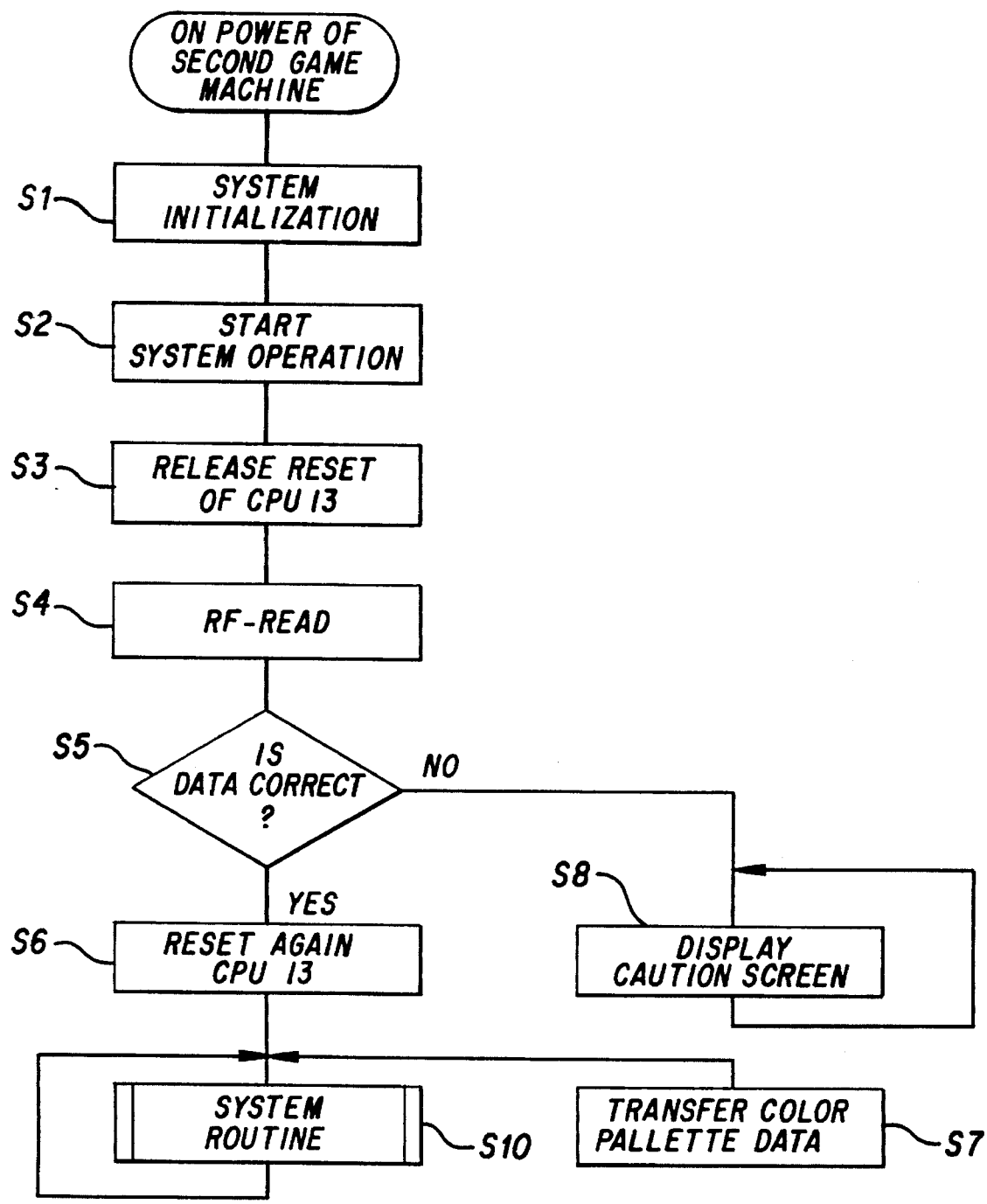
FIG. 19 is a flowchart showing an operation of the embodiment in turning-on a power source of a second game machine.

FIG. 19–FIG. 23 are flowcharts showing an operation of the adapter of this embodiment shown. In FIG. 19, if the power source switch of the second game machine 30 is turned-on, in a step S1, the CPU 31 makes the whole system to be initialized on the basis of the program in the system ROM 16, and starts the following operations. In a step S2, a system operation is started. In a step S3, the CPU 31 makes the reset of the CPU 13 to be released. In a step S4, the ID data stored in the storage area 210 of the program ROM 21 (e.g. the character data for determining applicability of the cartridge disclosed in Japanese Patent Laying-open No. 2-210562 (corresponding to U.S. Pat. No. 5,134,391)) is read-out. It is determined whether or not the ID data is predetermined one or is correct in a step S5, if it is determined that the ID data is correct, in a step S6, the CPU 13 is reset again.

Figure 20:
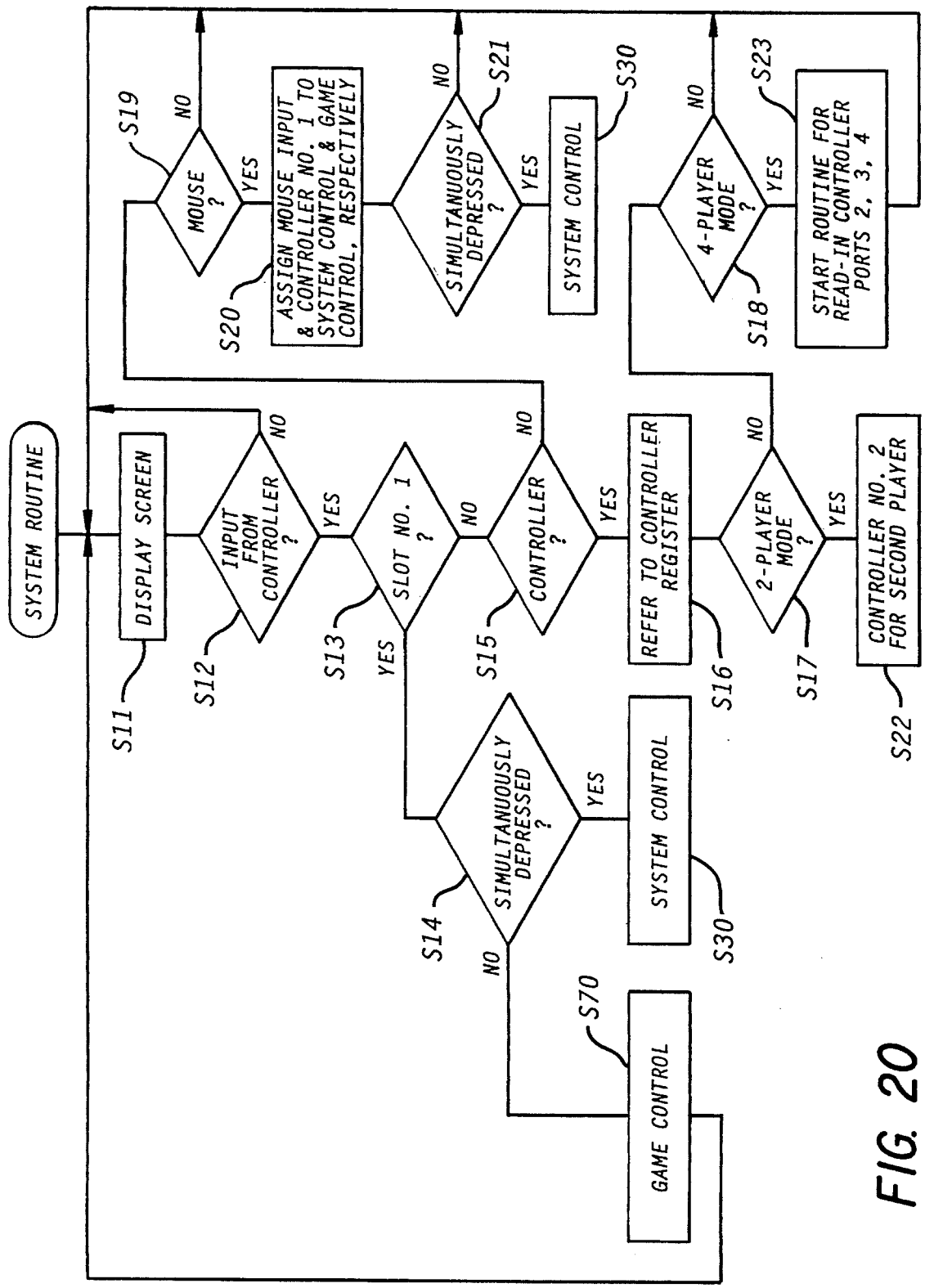
FIG. 20 is a flowchart showing a system routine of the embodiment.

Thereafter, in a step S7, the data stored in the storage area 212 of the program ROM 21 is read-out. If the data is the color palette setting code indicative of a game where the color palette is to be automatically set, the palette data designated in advance by the manufacturer in the storage area 216 is read-out, and then, written into the W-RAM 18w. The palette data designated by the manufacturer (the palette number and the color information corresponding to respective gradations for each palette number), being temporarily stored in the W-RAM 18w, is read-out by the CPU 13 and applied to the CPU 31. Accordingly, the CPU 31 reads-out the color information respectively corresponding to the gradations (the gradations 1–4) of the palette number stored in the system ROM 16 on the basis of the color palette data, and the color information is written in the storage area 353 of the W-RAM 35 in corresponding to the palette number. Thereafter, in a step S8, a system subroutine shown in FIG. 20 is executed.

In addition, if it is determined that the ID data is not the predetermined one in the step S5, in a step S9, a caution screen (or warning screen) informing that the cartridge can not be used is displayed.

Next, with referring FIG. 20, a system subroutine will be described. In the system subroutine, first, in a step S11, the screen of the game window 52 is displayed within the monitor screen 51 shown in FIG. 10. In a step S12, it is determined whether or not an input from the slot (connector) 301 or 302 exists, and operations of the steps S11 and S12 are repeated until any input is entered. If any input exists, in a step S13, it is determined whether or not the input is from the first slot 301. In a case of the input of the slot 301, in a step S14, it is determined whether or not the left switch 44L and the right switch 44R of the controller 40 are simultaneously depressed, and if "YES", the process proceeds to a subroutine of system control in a step S30 (see FIG. 21). On the other hand, if it is determined that the input is not from the slot 301, in a step S15, it is determined whether or not the input means attached to the second slot 302 is the controller 40. If it is determined that the input means is the controller, in a step S16, data in a controller register (not shown; however, a part of storage area of the W-RAM 35 can be used as the register) in which the operation status of the controller is temporarily stored is referred to. As a result, in a step S17, it is determined whether or not the game mode is a two-player mode, and if not, in a step S14, it is determined whether or not the game mode is a four-player mode, and if not, the process returns to the step S11.

On the other hand, if it is determined that the input means is not controller 40 in the above described step S15, in a step S19, it is determined whether or not the input is from the mouse. In a case of the input from the mouse, the process proceeds to the system control in a step S20. In a succeeding step S21, if it is determined that the right and left switches of the mouse are simultaneously depressed, the process proceeds to a step S30 such that the subroutine of the system control for window input is executed.

In addition, negative determination is performed in the step S19 or S20, the process returns to the step S11.

Furthermore, if the two-player mode is determined in the above described step S17, a gaming operation for two players by two controllers 40 becomes to be executed in a step S22. If the four-player mode is determined in the step S18, data of respective controller ports of a controller expansion connection device (not shown) by which four controllers at maximum can be connected to the second game machine are read-in in a step S23.

Furthermore, negative determination is performed in the step S14, in a step S24, an operation of game control subroutine (normal game processing operation) is executed in a step S24.

Figure 21:
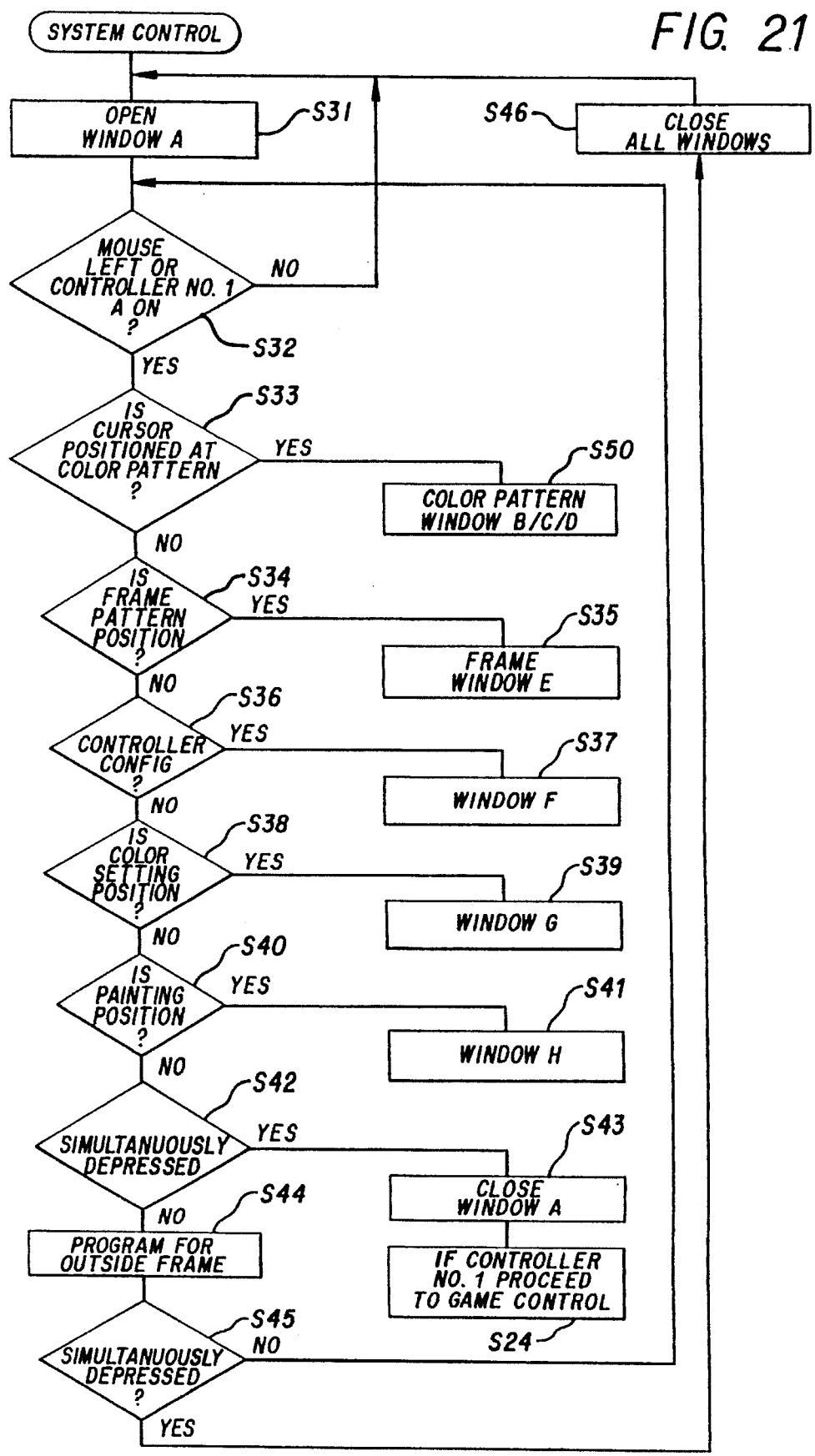
FIG. 21 is a flowchart showing a system subroutine.
Figure 22:
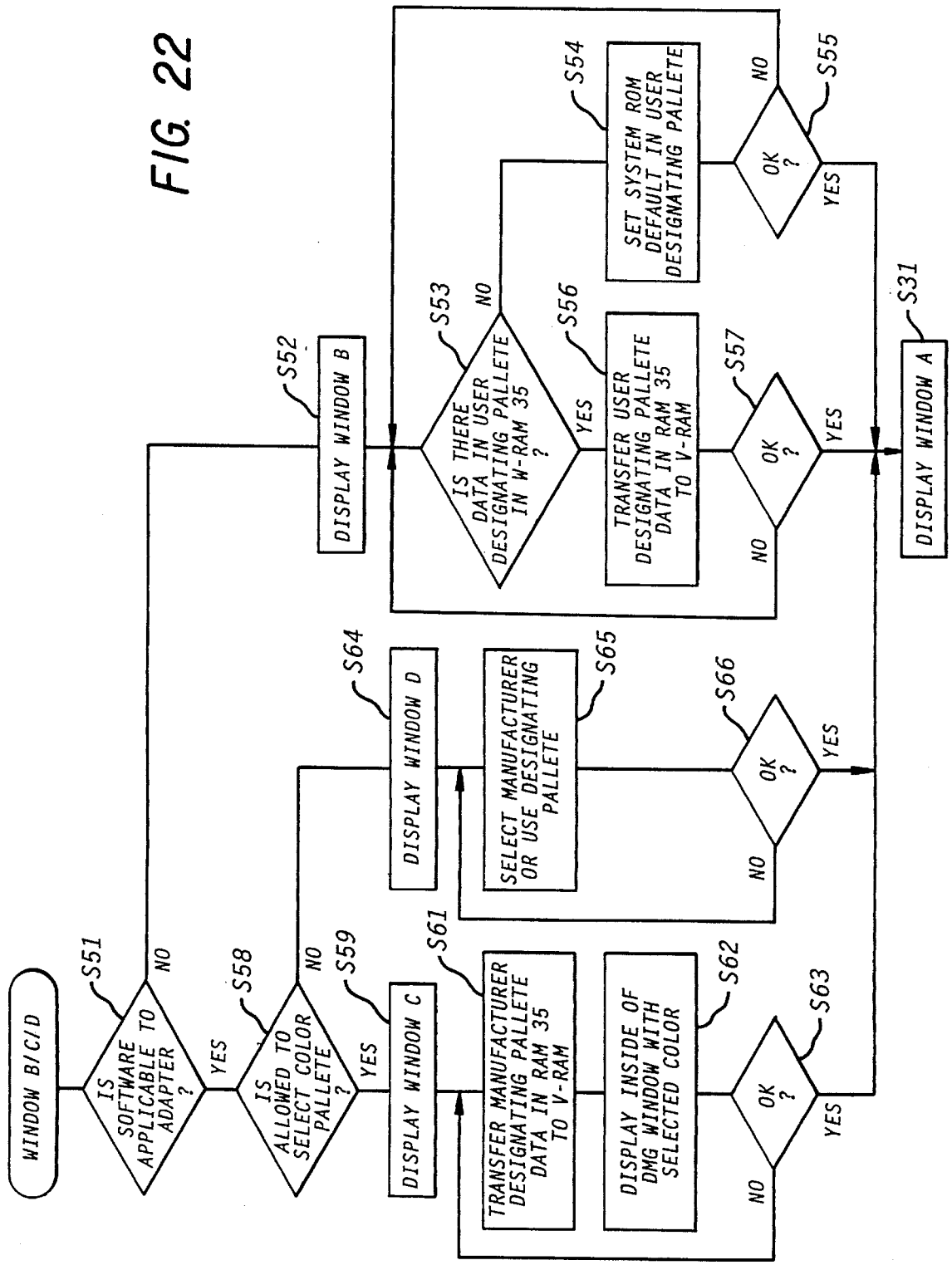
FIG. 22 is a flowchart showing in detail the windows B, C and D.
Figure 23:
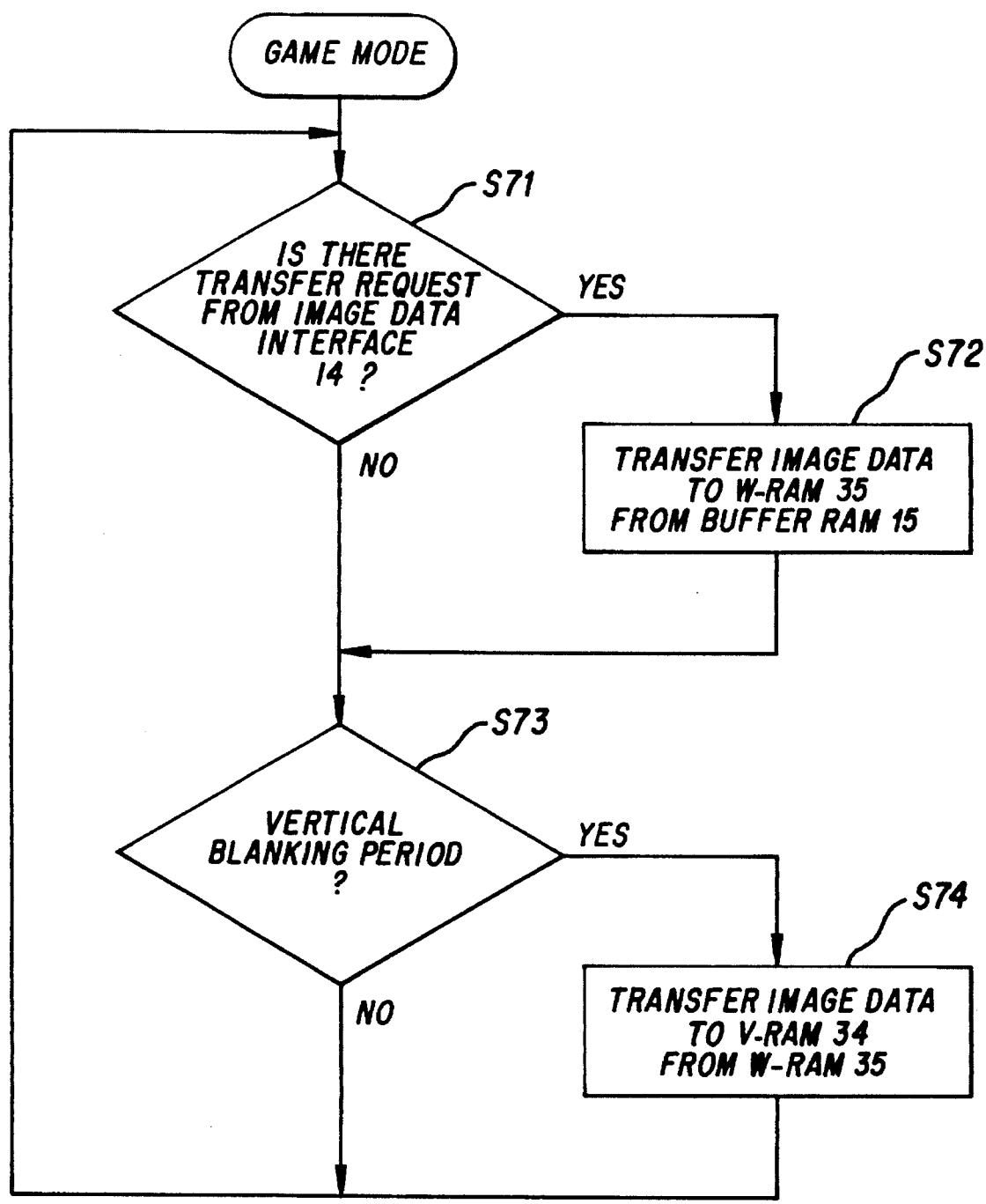
FIG. 23 is a flowchart showing an operation in a game mode.

Next, with referring FIG. 21, an operation of the system control subroutine will be described. At first, in a step S31, the screen of the window A is displayed (or opened) at a display position of the window display frame 52 shown in FIG. 11. In a step S32, it is determined whether or not the action switch (A button) 43a of the controller or the left switch of the mouse connected to the first slot 301 is depressed. If such a switch is not depressed, operation of the steps S31 and S32 are repeated. In contrast, if the switch is depressed, it is determined whether or not a position of the cursor moved through the operation of the directional switch 41 designates the illustration or symbol indicative of the color palette (or color pattern) setting mode in a step S33. In a case where the user or game player wants to set the color palette, after the illustration or symbol indicative of the color palette is designated by the cursor in a display state of the window A, the switch 43a is depressed, whereby the color palette setting mode is determined. If the color palette setting mode is determined, the process proceeds to a step S50. In the step S50, a subroutine of the color palette selection mode is executed; however, a detailed operation thereof will be described later with referring FIG. 22.

In the state where the window A is displayed, if the frame pattern input mode is selected by the user or game player, this is determined in a step S34. In such a case, in a step S35, the screen of the window E for inputting the frame pattern shown in FIG. 15 is displayed. In the window E, a plurality of kinds of frame illustrations are displayed, for example. The setting operation of the frame pattern is executed in a manner that the cursor is moved toward a desired frame illustration through the operation of the directional switch 41 so as to designate the desired frame illustration and the switch 43a is depressed, and then, a decision illustration or symbol (OK) is designated by the cursor, and the switch 43a is depressed again. In addition, if it is necessary to cancel a selected frame pattern or illustration, a cancel illustration or symbol (NO) may be selected prior to the designation of the decision illustration or symbol, and then, it is possible to perform again the selecting operation of the frame illustration or pattern.

In the state where the window A is displayed, if the controller setting mode is selected by the user or game player, this is determined in a step S38, and in a step S37, the screen of the window F shown in FIG. 18 is displayed. In a state where the window F is displayed, if the user performs the input operation for changing the functions of the plurality of switches included in the controller 40, in response to the input operation, changing processing of the data stored in the register corresponding to the switches is performed. For example, in the window F, an arrangement view of the action switch 43 of the controller as well as a plurality of kinds of illustrations or symbols indicative of the functions of the respective switches 43a–43d. More specifically, the illustration or symbol at a left end indicates that only the switch 43a is set for a first function (A operation) and the switches 43b–43d are to be set for a second function (B operation). The illustration or symbol at a center indicates that the switches 43a and 43b are to be set for the first function (A operation), and the switches 43c and 43d are to be set for the second function (B operation). The illustration or symbol at a right end indicates that the switch 43a is to be set for the first function (A operation), the switch 34b is to be set for the second function (B operation), the switch 43c is to be set for a succeedingly shooting function in the A operation, and the switch 43d is to be set for a succeedingly shooting function in the B operation. The user moves the cursor toward a display position of the illustration or symbol by which a desired function is set by operating the directional switch 41, and then, depresses the switch 43a, and thereafter, designates the decision illustration or symbol (OK) by the cursor and depresses the switch 43a again, whereby the functions of the respective switches 43a–43d as selected and set are stored in the W-RAM 35.

In the state where the window A is displayed, if the color setting mode is selected by the user or game player, this is determined in a step S37. In such a case, the screen of the window G shown in FIG. 17 is displayed in a step S39. In the window G, user setting palettes corresponding to the four kinds of gradations is displayed at a left end, and a plurality of color samples are displayed at a center. At a right side of the center, a page designating portion by which the color to be displayed in the color sample display portion is changed through turning pages of the color samples forward or backward is displayed. At further right side, the decision or cancel illustrations or symbols (OK or NO) for setting the color of the user setting palette or for designating a cancel of the color which has been set is displayed. In such a display state, in order to set the color palette, the game player moves the cursor through the operation of the direc-
tional switch 41 so as to designate the palette corresponding to the gradation to be set, and depresses the A switch 43a, and thereafter, moves the cursor on a desired color of the color samples and depresses the A switch 43a again. Such operations are performed for each of the gradations, and lastly, the decision illustration or symbol (OK) is designated, the color palette data thus selectively set are written in the user set color palette storage area of the storage area 353 in the W-RAM 35.

In the state where the window A is displayed, if the user or game player selects the picture painting mode, the picture painting mode is determined in a step S41. In such a case, the screen of the window H shown in FIG. 18 is displayed in a step S42. In this mode, a frame-like display area of the monitor screen 51 outside the game window 52 (a portion indicated by slanted lines) becomes a picture painting area, and in the window H, illustrations or symbols of a selected color, a color sample, page turning symbol, eraser, undo (having meaning that a status is to be returned just before status), decision (OK) and cancel (NO) are displayed. Then, in order to paint a dot picture at a desired coordinate position in the picture painting area, the user or game player designates the coordinate position by moving the cursor, and thereafter, a color for the dot is selected out of the color samples, and the color is displayed as the selected color. By doing such an operation for each dot, the frame pattern is drawn, and accordingly, it is possible to display the desired frame pattern within the frame. The dot data of the frame pattern thus painted is written in the storage area 342 of the V-RAM 34 in a renewal manner. In addition, in a case where the frame pattern which has been painted is to be changed, the eraser symbol is designated, and an area to be erased is designated.

In the state where the window A is displayed, in a case where the user wants to terminate the display of the window A and to perform another operation such as a game operation, the left switch 44L and the right switch 44R are simultaneously depressed. In response thereto, it is determined that the left switch 44L and the right switch 44R are simultaneously depressed in a step S43, and thereafter, in a step S44, the window A is closed, and therefore, there occurs a state where the screen of the game window 52 is displayed in the monitor screen 51. If it is determined that what connected to the slot 301 is the controller 40 in a succeeding step S45, the process proceeds to the step S24 for the game control. In addition, it is determined that the left switch 44L and the right switch 44R are not simultaneously depressed in the step S43, after processing for a case where the cursor is protruded out of the frame in a step S45, it is determined whether or not the switches 44L and 44R are simultaneously depressed, that is, whether or not it is commanded that all the windows are to be closed. If there is a command for closing all the windows, after the processing for closing is executed in a step S47; however, it is determined that the command for closing all the windows is not performed, the process returns to the step S32.

Next, a color palette selection operation will be described. If the color palette setting mode is selected during a period that the window A is displayed, on the basis of the program stored in the system ROM 16, a subroutine for displaying the windows B, C and D shown in FIG. 22 and for inputting the icons on the basis of the display is executed.

More specifically, in a step S51, it is determined whether or not the cartridge inserted into the insertion port 11a is a cartridge or software in which the color palette can be automatically set, on the basis of the color palette identifying data stored in the storage area 212 of the ROM 21. If it is determined that the color palette can not be automatically set, in a step S52, the window B shown in FIG. 12. In a step S53, it is determined whether or not the user set palette data is stored in the storage area 353 of the W-RAM 35. If not, after a default of the system ROM 18 in a step S54, that is, after the color palette data stored at a head is written in the storage area 353, it is determined whether or not the decision illustration or symbol is designated in a step S55, and if not, the process returns to the step S53 to repeat the steps S53, S54 and S55. In such a state, if the decision illustration or symbol is selected, the status returns to the display of the window A of the step S31.

On the other hand, in a case where the color setting operation described with referring the above described window G has been executed prior to the display of the window G, it is determined that the color palette data desired by the user is set and stored in the user set palette (the storage area 353) of the W-RAM 35. In a succeeding step S56, the user set color palette data stored in the storage area 353 of the W-RAM 35 is transferred to the V-RAM 34. Thereafter, when the decision illustration or symbol is designated by the user, this is determined in a step S57, and then, the process process to the step S31.

If the illustration or symbol for canceling is selected, this is determined in a step S57, and the process returns to the step S53.

On the other hand, in a case where the cartridge 20 is of an applicable software in which the color setting can be automatically performed for the adapter 10, in the above described step S51, it is determined that the cartridge 20 is the applicable software. In a succeeding step S57, on the basis of the color palette identifying data stored in the storage area 212, it is determined whether or not the selection of the color palette is allowed or permitted.

If allowed, the window C shown in FIG. 13 is displayed in a step S59. In the window C, the color palette set in advance in the program of the system ROM 16 by the manufacturer (the palette numbers 1–10; the color palette transferred in advance in the aforementioned step S7), the manufacturer designating color palette set in the ROM 21, the user set color palette if the desired color palette has been selected by the user with utilizing the window G, the decision illustration or symbol, and the cancel illustration or symbol are displayed. Then, if no palette is selected by the user, in a step S61, the color palette designated by the manufacturer is displayed brightly, and the palette data designated by the manufacturer stored in the storage area 353 W-RAM 35 is transferred to the V-RAM 34. Furthermore, if the user selects the desired color palette by moving the cursor, the illustration or symbol corresponding to the selected color palette is displayed brightly, and the selected color palette data is transferred to the V-RAM 34. Thereafter, if the decision illustration or symbol is designated, this is determined in a step S63, and then, the process returns to the step S31. In addition, if the cancel illustration or symbol is selected, this is determined in the step S63, and then, the process returns to the step S61.

Furthermore, if it is determined that the selection of the color palette is not allowed (or permitted) in the step S53, in a step S64, the window D shown in FIG. 14 is displayed. In the window D, only the illustration or symbol indicative of the color palette designated by the manufacturer is displayed brightly, and since the illustrations or symbols indicative of other color palettes are displayed darkly, the user can not freely select the color palette, and therefore, the change of the color palette data is inhibited. Accordingly, in a step S65, the color palette data designated by the manufacturer stored in the W-RAM 35 is transferred to the V-RAM 34. Thereafter, if the decision illustration or symbol is designated, this is determined in a step S66, the process returns to the display operation of the window A in the step S31, whereby the operation for the color palette setting mode is terminated. In addition, if the cancel illustration or symbol is selected, this is determined in the step S66, the process returns to the step S65.

Next, an operation of a case where in the game mode, the character is displayed in color on the basis of the color palette data which is automatically or manually set in the above described manner and the gradation data will be described. Prior to or in parallel to the game control, the buffer RAM 15 temporarily stores the gradation data of 1–4 blocks (20 characters–80 characters) in a FIFO manner, but the gradation data has been transferred to the W-RAM 35 one by one block prior to the gradation data of 4 blocks are stored in the buffer RAM 15, that is, prior to the buffer RAM 15 is filled.

In such a state, a routine shown in FIG. 28 is executed by the CPU 31 for the game control. More specifically, in a step S71, it is determined whether or not a transfer request is inputted from the image data interface 14. In addition, the transfer request is a command generated by the CPU 31 on the basis of the program in the system ROM 16, and generated at a timing that the gradation data for one whole screen or more are stored in the buffer RAM 15. If the transfer request is generated, in a step S72, the gradation data stored in the buffer RAM 15 is transferred to the W-RAM 35 and stored therein.

On the other hand, if no transfer request is generated, in a step S73, the vertical blanking period is determined because the image displayed on the monitor is disturbed if the gradation data is transferred during a period other than the vertical blanking period (i.e. the display period), and therefore, it is necessary to prevent such disturbance. If the vertical blanking period is determined, in a step S74, the gradation data stored in the W-RAM 35 is transferred to the storage area 342 of the V-RAM 34. After the step S73 or S74, the process returns to the step S71, and therefore, operations in the steps S71–S74 are repeated during the game. In a state where the gradation data and the color palette data are thus temporarily stored in the V-RAM 34, the video processor 33 generates, on the basis of the gradation data stored in the storage area 342 and the color palette data as selected or set and stored in the storage area 343, a color image signal (a color video signal) for each dot, and applies the color image signal to the monitor in synchronization with the horizontal scanning (raster scanning) of the monitor. In other words, the video processor 32 generates the image signal of the color equal to the color information decided by modifying the gradation data with the color palette data for each dot in synchronization with the horizontal scanning. Resultingly, even if the cartridge 20 stores the image display data (character data) of the monochrome gradation data by which no color display can be performed, it is possible to display the image with the color designated by combination of the gradation data and the color palette data.

In addition, the video processor 32 may generate a composite video signal wherein the synchronization signal is superposed on a color image signal as necessary.

Furthermore, in a case where the program for second game machine is stored in the storage areas 217–219 of the ROM 21, the program data is directly transferred to the CPU 31 from the CPU 13 via the image data interface 14, and the CPU 31 writes the data in the V-RAM 34. Thus, if the program for the second game machine is stored in a portion of the area, it is possible to increase qualities of the image and the sound up to the same degree as that of the cartridge for second game machine.

In addition, in the above described embodiments, a case where the first game machine displays the image with the four gradations in monochrome; however, the present invention can be applied to a modified embodiment as follows. More specifically, in a case where the first game machine is a television game machine having the number of colors smaller than that of the second game machine, on the basis of the color tone data stored in the ROM of the cartridge for the first game machine and the color palette data added by the program in the system ROM 16, it is possible to display the image in color with a larger number of colors capable of being used in the second game machine.

Furthermore, in the above described embodiments, a case where the adapter 10 is accommodated in a housing separated from the second game machine 30 and the same is detachably attached to the second game machine 30; however, the adapter 10 may be accommodated within the second game machine uniformly.

Furthermore, the second game machine may be a game machine with color liquid crystal display, and the adapter 10 may be uniformly accommodated in such a second game machine. In such a case, a cartridge developed for the first game machine of four gradations in monochrome can be applied to the second game machine with color liquid display.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game signal conversion apparatus by which a cartridge for a first game machine which includes a first storage means storing image display data, said first game machine displaying a character for a game with two or more kinds of gradations or color tones for each dot on the basis of the image display data, is made to be used in a second game machine capable of displaying a character for a game with a plurality of color tones larger than the number of kinds of color tones capable of being displayed in the first game machine, said first storage means storing in advance said image display data including character data for a plurality of characters each represented with two or more kinds of gradations or color tones for each dot, and display control data for controlling display of the plurality of characters, said second game machine being used through connection to a color television, and including at least a second storage means storing color palette data for color-display, and a color image signal generator for generating, on the basis of the image display data for specifying one of the two or more kinds of gradations or color tones and the color palette data stored in the second storage means, a color image signal of a color selected out of a large number of kinds of colors corresponding to the two or more kinds of gradations or color tones, said game signal conversion apparatus, comprising:

a connector to which said cartridge for said first game machine is detachably attached;

a color palette selector which selects a color palette for displaying the character with a color according to a combination of a plurality of color information corresponding to the number of the kinds of gradations or color tones of a single character by designating the color for each of said two or more kinds of gradations or color tones;

color information writing circuitry for writing the color information of the color palette selected by said color palette selecting selector into said second storage means; and an image data generator which generates, on the basis of the character data and display control data stored in said first storage means included in said cartridge for said first game machine connected to said connector, image data for designating one of two or more kinds of gradations or color tones similar to that of the first game machine for each dot, and which applies the image data to said color image signal generator.

2. A game signal conversion apparatus according to claim 1, wherein said first storage means stores color palette setting mode data for identifying whether the color palette can be automatically set or the color palette can be manually set by a user, and color palette data for automatically setting the color palette, said color palette selector means including
an automatically setting means which automatically sets the color palette data stored in said first storage means when the color palette setting mode data stored in said first storage means is data representing that the color palette is to be automatically set, and
a manually setting means which manually sets the color palette data selected by the user when the color palette setting mode data stored in said first storage means is data representing that the color palette is to be manually set by the user.

3. A game signal conversion apparatus according to claim 2, wherein said second game machine further includes an operation means provided in association with said second game machine, and said manually setting means includes a window display means which displays a window on a screen of said color television and a command character indicative of a command for selecting the color palette within the window, and a selection decision means which decides that the color palette corresponding to the command character is selected when the command character is selected through an operation of said operation means.

4. A game signal conversion apparatus by which a cartridge for a first game machine, which is used by being attached to a first game machine having a first processor, and includes a first storage means storing first image display data for displaying a character for a game by the first game machine, is made to be used in a second game machine which executes a game by processing second image display data utilizing a second processor which is different in kind from the first processor, said first storage means storing in advance the first image data including data of a plurality of characters and display control data for controlling display of the plurality of characters, said second game machine being used through connection to a color television, and including at least a second storage means storing data to be processed or processed by said second processor, an image signal generator which generates an image signal on the basis of said first image display data or said second image display data, and supplies the image signal to the color television, and an operation controller, said game signal conversion apparatus, comprising:

a connector to which said cartridge for first game machine is detachably attached;

a third processor which has a processing ability corresponding to the processing ability of said first processor included in said first game machine, and generates first image data through processing of the first image display data stored in said first storage means;

image data transfer circuitry which supplies the first image data generated by said third processor to said second processor;

window display circuitry which displays a window on a screen of said color television and a command character utilized for inputting data within the window when data necessary for making said cartridge for first game machine be in conformity with said second game machine is to be inputted;

a command code generator which generates a code corresponding to the command character selected through an operation of the operation controller and applies the code to said second processor when the command character is selected through the operation of said operation controller; and an image data generator which generates, on the basis of the character data and the display control data stored in said first storage means included in said cartridge for said first game machine being connected to said connector, image data for designating one of two or more gradations or color tones similar to that of the first game machine, and applies the image data to said second processor.

5. A game signal conversion apparatus according to claim 4, wherein said first game machine displays the character for game with two or more kinds of gradations or color tones for each dot, said first storage means stores in advance said first image display data including character data of a plurality of characters each being designated by two or more kinds of gradations or color tones for each dot and the display control data for controlling the display of the plurality of characters, said second game machine is used through a connection to a color television capable of displaying the character in color with a plurality of colors larger than the number of kinds of colors capable of being displayed by the first game machine, and including at least a second storage means for storing color palette data for color-display, a color image signal generator which generates, on the basis of the first image display data for specifying one of two or more kinds of gradations or color tones and the color palette data stored in said second storage means, a color image signal of a color specified in corresponding to the kind of gradation or color tone, said window display circuitry displays the command character for designating a desired color information to be displayed through conversion for each of the kind of gradations or color tones when the color palette is to be selected, said command data generator generates the color information of the color palette corresponding to the selected command character when the command character displayed within said window through the operation of said operation controller, and writes the color information in said second storage means, and said third processor includes an image data generator which generates, on the basis of the character data and the display control data stored in said first storage means, first image data designating one of the two or more kinds of gradations or color tones similar to that of the first game machine for each dot, and applies the first image data to said second processor.

6. A game signal conversion apparatus according to claim 4, wherein said first storage means further stores second image display data, and said third processor reads-out the second image display data stored in said first storage means with a data format as it is, and said image data transfer circuitry supplies the second image display data read-out by said third processor to said second processor.

* * * * *